(12) United States Patent
Nikaku et al.

(10) Patent No.: US 11,381,702 B2
(45) Date of Patent: Jul. 5, 2022

(54) IMAGE READING DEVICE, IMAGE READING METHOD, AND COMPUTER-READABLE MEDIUM

(71) Applicants: Daisuke Nikaku, Kanagawa (JP); Tatsuya Ishii, Kanagawa (JP); Hideki Hashimoto, Tokyo (JP); Yutaka Ohmiya, Tokyo (JP); Takayuki Kawamoto, Tokyo (JP)

(72) Inventors: Daisuke Nikaku, Kanagawa (JP); Tatsuya Ishii, Kanagawa (JP); Hideki Hashimoto, Tokyo (JP); Yutaka Ohmiya, Tokyo (JP); Takayuki Kawamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/141,240

(22) Filed: Jan. 5, 2021

(65) Prior Publication Data

US 2021/0218860 A1    Jul. 15, 2021

(30) Foreign Application Priority Data

Jan. 14, 2020   (JP) .............................. JP2020-003703

(51) Int. Cl.
*H04N 1/028*   (2006.01)
*H04N 1/00*    (2006.01)

(52) U.S. Cl.
CPC ..... *H04N 1/02815* (2013.01); *H04N 1/00013* (2013.01); *H04N 1/00037* (2013.01); *H04N 1/00702* (2013.01); *H04N 1/00766* (2013.01)

(58) Field of Classification Search
CPC ........... H04N 1/02815; H04N 1/00013; H04N 1/00766; H04N 1/00702; H04N 1/0037;
(Continued)

(56) References Cited

U.S. PATENT DOCUMENTS 6,233,066 B1 *  5/2001  Kojima ................ H04N 1/0402
                                                          358/404
6,583,895 B1 *  6/2003  Kuwahara .............. H04N 1/107
                                                          358/444
(Continued)

FOREIGN PATENT DOCUMENTS

JP    H04-362858    12/1992
JP    H07-040286    2/1995
(Continued)

OTHER PUBLICATIONS

U.S. Appl. No. 16/886,810, filed May 29, 2020, Masamoto Nakazawa, et al.
(Continued)

*Primary Examiner* — Negussie Worku
(74) *Attorney, Agent, or Firm* — Xsensus LLP

(57) ABSTRACT

An image reading device includes a light source configured to irradiate a subject; a reading unit configured to detect reflected light generated by a subject reflecting light emitted from the light source, to perform reading; and a control unit configured to perform turn-on control on the light source. The control unit is configured to perform the turn-on control to change a turn-on condition such that the light source is turned on during a period when at least a detection region including an image pattern on the subject passes through a reading position of a reading unit, based on position information of the image pattern of the subject in a first operation mode for reading the subject, and perform the turn-on control to make the turn-on condition of the light source constant regardless of the image pattern of the subject in a second operation mode for reading the subject.

13 Claims, 23 Drawing Sheets

(58) Field of Classification Search
CPC .... H04N 1/00–00005; H04N 1/00021–00047; H04N 1/00058–0009; H04N 1/27–31; H04N 1/32144–32352; H04N 1/38–419; H04N 1/46–648; H04N 2201/00–0006; H04N 2201/3269–3271; H04N 2201/33378; G06K 15/025–027; G06K 15/129; G06K 15/1825; G06K 15/1826; G06K 15/1835–1847; G06K 15/1848–1855; G06K 15/1867–1881; G06K 15/1889–1898; G06K 2215/004–008; G06K 2215/0094
USPC ........................................................ 358/1.15
See application file for complete search history.

(56) References Cited

U.S. PATENT DOCUMENTS

| | | | | |
|---|---|---|---|---|
| 6,771,395 | B1* | 8/2004 | Kito | G03B 27/32 358/474 |
| 8,861,047 | B2* | 10/2014 | Ishido | H04N 1/00681 358/488 |
| 9,465,970 | B2* | 10/2016 | Wang | H04N 5/2253 |
| 2010/0296135 | A1* | 11/2010 | Tanaka | H04N 1/00758 358/475 |
| 2011/0026085 | A1 | 2/2011 | Tsukahara et al. | |
| 2011/0051201 | A1 | 3/2011 | Hashimoto et al. | |
| 2012/0062929 | A1 | 3/2012 | Ishii et al. | |
| 2013/0044338 | A1 | 2/2013 | Nikaku | |
| 2014/0004432 | A1 | 1/2014 | Gronwald | |
| 2014/0078532 | A1 | 3/2014 | Nikaku | |
| 2014/0152735 | A1 | 6/2014 | Yorimoto et al. | |
| 2015/0125032 | A1* | 5/2015 | Yamanaka | G06K 9/00624 382/103 |
| 2016/0003673 | A1 | 1/2016 | Hashimoto et al. | |
| 2016/0173719 | A1 | 6/2016 | Hashimoto et al. | |
| 2016/0182753 | A1 | 6/2016 | Takahashi et al. | |
| 2016/0219163 | A1 | 7/2016 | Shirado et al. | |
| 2016/0373604 | A1 | 12/2016 | Hashimoto et al. | |
| 2017/0140689 | A1* | 5/2017 | Kobori | G09G 3/02 |
| 2017/0180579 | A1* | 6/2017 | Suga | H04N 1/00559 |
| 2017/0201700 | A1 | 7/2017 | Hashimoto et al. | |
| 2017/0244853 | A1 | 8/2017 | Yabuuchi et al. | |
| 2017/0302821 | A1 | 10/2017 | Sasa et al. | |
| 2017/0353623 | A1* | 12/2017 | Ono | H04N 1/02815 |
| 2018/0139345 | A1 | 5/2018 | Goh et al. | |
| 2019/0163112 | A1 | 5/2019 | Nikaku et al. | |
| 2019/0238702 | A1 | 8/2019 | Ikemoto et al. | |
| 2019/0289163 | A1 | 9/2019 | Hashimoto et al. | |
| 2019/0327387 | A1 | 10/2019 | Hashimoto | |
| 2019/0335061 | A1 | 10/2019 | Nakazawa et al. | |
| 2020/0099812 | A1 | 3/2020 | Ishii | |

FOREIGN PATENT DOCUMENTS

| | | |
|---|---|---|
| JP | H09-185308 | 7/1997 |
| JP | 2006-165786 | 6/2006 |
| JP | 2014-111326 | 6/2014 |

OTHER PUBLICATIONS

U.S. Appl. No. 16/861,233, filed Apr. 29, 2029, Yutaka Ohmiya, et al.

* cited by examiner

IMAGE READING DEVICE, IMAGE READING METHOD, AND COMPUTER-READABLE MEDIUM

CROSS-REFERENCE TO RELATED APPLICATIONS

The present application claims priority under 35 U.S.C. § 119 to Japanese Patent Application No. 2020-003703, filed on Jan. 14, 2020. The contents of which are incorporated herein by reference in their entirety.

BACKGROUND OF THE INVENTION

1. Field of the Invention

The present invention relates to an image reading device, an image reading method, and a computer-readable medium.

2. Description of the Related Art

In the field of production printing in which a high quality is required for quality (printing position accuracy, color reproducibility, color stability, and the like) of a printed image, an in-machine sensing technology of arranging a reading device in an image forming device and correcting image forming conditions (image printing position, magnification, distortion, and the like) based on a result of reading a transfer paper as a subject has been known.

More specifically, for example, the following technologies have been already known. As a technology of improving the position accuracy of the printed image, there is a technology of reading each of an arbitrary pattern position (image position) printed on the transfer paper and an outer shape (paper edge position) of the transfer paper by the reading device and correcting the image formation conditions so that an image suitable for a shape (outer shape) of the transfer paper can be formed.

In addition, as a technology of improving the color reproducibility and the color stability of the printed image, there is a technology of detecting a density and a deviation of a predetermined pattern on the transfer paper by the reading device and correcting the image formation conditions based on a detection result so that the color reproducibility and the color stability of the printed image are improved.

Further, in recent years, an image reading device and an image forming device that have both an operation mode for improving the printing position accuracy and an operation mode for improving the color reproducibility and the color stability have become widespread.

In the operation mode for improving the printing position accuracy described above, it has been known that if a light source is turned on even during a period when image reading is not necessary, such as at a position where a predetermined pattern does not exist on the transfer paper, wasteful power consumption occurs and long-term deterioration of the light source over time is accelerated. Therefore, in order to avoid such a problem, it is preferable to turn off the light source or to control an illumination condition so as to suppress a light emission amount during the period when the image reading is not necessary.

Meanwhile, in the operation mode for improving the color reproducibility and the color stability, it is desirable to stabilize a surface illuminance (light amount) on the original as much as possible by making a turn-on condition constant in advance regardless of a position of the predetermined pattern on the transfer paper in order to detect the density and the deviation of the predetermined pattern on the transfer paper with high accuracy. Therefore, if the control is performed under the illumination condition such as the operation mode for improving the printing position accuracy described above, it is not a good idea in terms of stabilization of the surface illuminance (light amount), and a decrease in detection accuracy is caused.

Further, in each of the operation mode for improving the printing position accuracy and the operation mode for improving the color reproducibility and the color stability, which have become widespread in recent years, there was a problem that it is not possible to appropriately select control of an optimum or suitable turn-on condition according to a situation when performing printing.

As an image forming device that performs such turn-on control of the light source, a configuration in which a time until a mark for alignment is detected is predicted from a relative positional relationship between a stop position of the mark for alignment and a position of a mark sensor at the time of start of image formation and a mark detection signal from the mark sensor is not used as a reference for transferring an image to a photoconductor in a case where the predicted time is shorter than a time until the photoconductor stabilizes, in order to prevent the image from being transferred to the photoconductor before a charged state of the photoconductor stabilizes and shorten a waiting time until the image is transferred to the photoconductor is disclosed (for example, Japanese Unexamined Patent Application Publication No. 09-185308). In this image forming device, turn-on and turn-off of a scanner exposure lamp are controlled by predicting the time until the mark for alignment is detected from the relative positional relationship between the stop position of the mark for alignment and the position of the mark sensor.

In addition, as an image forming device that performs the turn-on control of the light source, a configuration including: a reading unit that includes a light emitting unit irradiating a recording medium with light and a light receiving unit receiving reflected light from the recording medium; a first correcting unit that reads the reflected light from a test pattern formed on the recording medium by the light receiving unit and performs position detection on detection data of the light receiving unit; and a second correcting unit that detects a position of the test pattern after making an amplitude of an interval cycle of the test pattern substantially constant, and further including a correction method selecting unit that reads a surface of the recording medium by the light receiving unit before the test pattern is formed and selects any one of the first correcting unit or the second correcting unit based on an adjustment result of sensitivity of the light receiving unit so that a reading result (output value) falls within a predetermined range, in order to suppress an influence of characteristics of a sheet material and an increase in a downtime to accurately specify the position of the test pattern, is disclosed (for example, Japanese Unexamined Patent Application Publication No. 2014-111326). In this image forming device, in output adjustment of the light receiving unit, an amount of light emitted by the light emitting unit is increased or decreased so that the output value falls within a predetermined voltage range.

However, in the technology described in Japanese Unexamined Patent Application Publication No. 09-185308, there is a problem that a unit switching to a control manner capable of maintaining a constant illumination condition is not disclosed, such that an illumination condition corresponding to an operation mode in which stabilization of a surface illuminance (light amount) is required cannot be selected. In addition, even in the technology described in Japanese Unexamined Patent Application Publication No. 2014-111326, there is a problem that an illumination condition corresponding to an operation mode in which stabilization of a surface illuminance (light amount) is required cannot be selected.

SUMMARY OF THE INVENTION

An image reading device includes a light source, a reading unit, a control unit, and a storage unit. The light source is configured to irradiate a subject with light. The reading unit is configured to detect reflected light generated by the subject reflecting light emitted from the light source, to perform reading. The control unit is configured to perform turn-on control on the light source. The storage unit is configured to store position information of an image pattern of the subject. The control unit is configured to perform the turn-on control to change a turn-on condition such that the light source is turned on during a period when at least a detection region including an image pattern on the subject passes through a reading position of the reading unit, based on the position information stored in the storage unit in a first operation mode for reading the subject. The control unit is configured to perform the turn-on control to make the turn-on condition of the light source constant regardless of the image pattern of the subject in a second operation mode for reading the subject.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
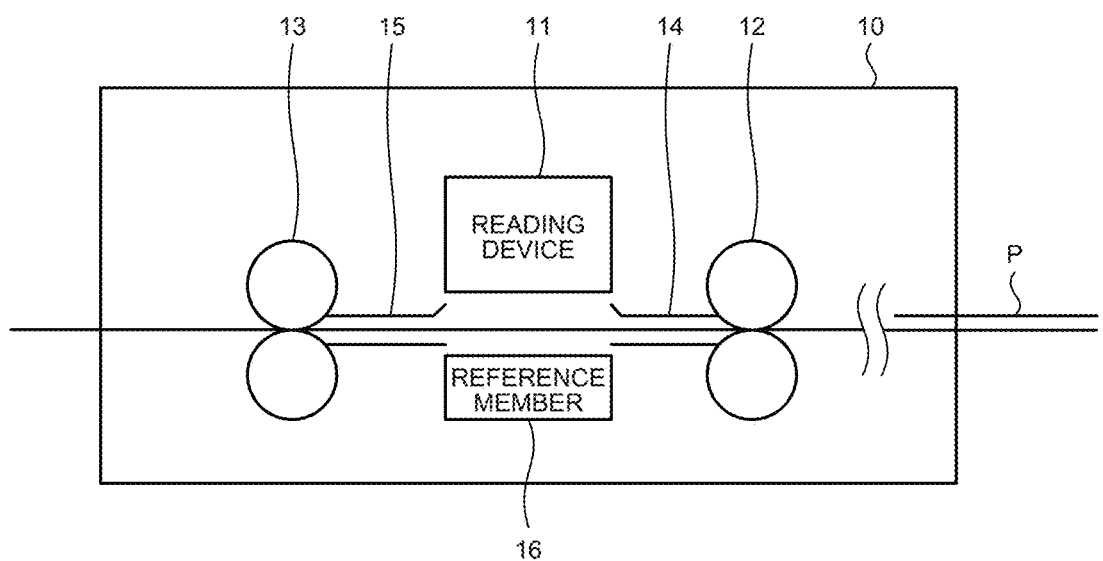
FIG. 1 is a diagram illustrating an example of a schematic structure of an image reading device according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an image reading device, an image reading method, and computer-readable mediumcapable of comprehensively improving a quality of a printed image by appropriately switching and controlling a turn-on condition of a light source according to each operation mode in a plurality of operation modes.

Hereinafter, embodiments of an image reading device, an image reading method, and a computer-readable medium according to the present invention will be described in detail with reference to the drawings. In addition, the present invention is not limited by the following embodiments, and components in the following embodiments include those easily conceived by those skilled in the art, those substantially identical to each other, and those in so-called equal ranges. Further, various omissions, substitutions, changes and combinations of components can be made without departing from the gist of the following embodiments.

First Embodiment

Schematic structure of image reading device FIG. 1 is a diagram illustrating an example of a schematic structure of an image reading device according to a first embodiment. A schematic structure of an image reading device 10 according to the present embodiment will be described with reference to FIG. 1.

The image reading device 10 illustrated in FIG. 1 is a device that reads an image pattern, or the like, by irradiating a subject P, which is a recording medium on which the image pattern is printed, with light from a light source and detecting reflected light reflected from the subject P. FIG. 1 illustrates a state in which the subject P is conveyed from the right side toward the left side when viewed on a paper. The image reading device 10 includes a reading device 11, a first conveying roller pair 12, a second conveying roller pair 13, conveying guide plates 14 and 15, and a reference member 16, as illustrated in FIG. 1.

The reading device 11 is the device that reads the image pattern or the like by detecting the reflected light reflected from the subject P in response to irradiating the subject P with the light from the light source.

The first conveying roller pair 12 is a roller pair that is arranged on an upstream side of a conveying path with respect to the reading device 11 and conveys the subject P toward the reading device 11. The second conveying roller pair 13 is a roller pair that is arranged on a downstream side of the conveying path with respect to the reading device 11 and conveys the subject P of which image pattern has been read by the reading device 11 to a downstream side.

The conveying guide plate 14 is a member that is arranged on the upstream side of the conveying path with respect to the reading device 11 and serves as a guide at the time of conveying the subject P, and limits a moving range of the subject P. The conveying guide plate 15 is a member that is arranged on the upstream side of the conveying path with respect to the reading device 11 and serves as a guide at the time of conveying the subject P, and limits a moving range of the subject P.

The reference member 16 is a member that is arranged at a position facing the reading device 11 and is to be read by the reading device 11 as a reference color. For example, a white (low density) reference member 16 is used to generate reference data when shading correction is performed on the image read from the subject P by the reading device 11. In addition, a black (high density) reference member 16 is used to detect an end portion of the subject P having a low density. Note that the reference member 16 is a plurality of members such as a white member and a black member and may be configured so that a member to be used is switched by a drive source according to an application of the image reading device 10.

Figure 2:
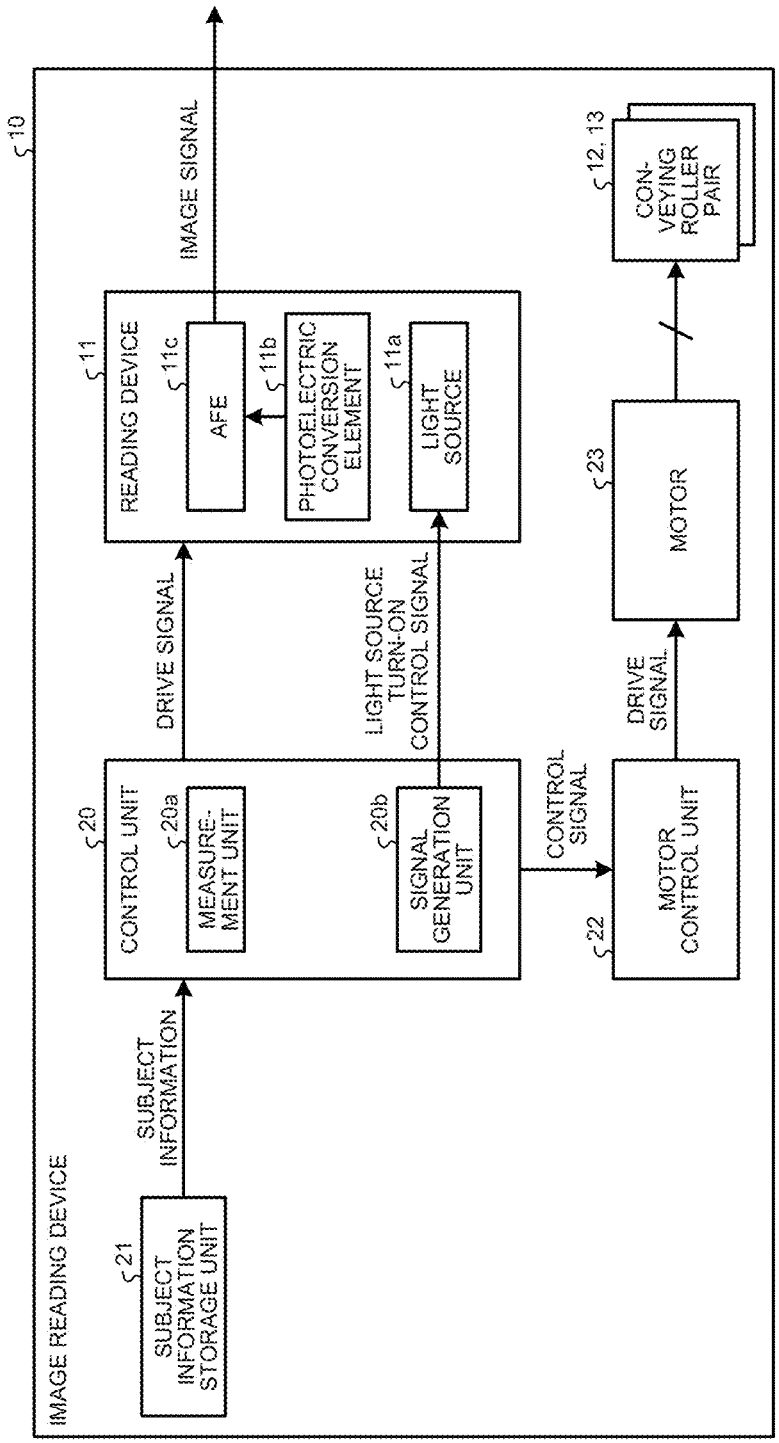
FIG. 2 is a diagram illustrating an example of a block configuration of the image reading device according to the first embodiment.

Block configuration of image reading device FIG. 2 is a diagram illustrating an example of a block configuration of the image reading device according to the first embodiment. A block configuration of the image reading device 10 according to the present embodiment will be described with reference to FIG. 2.

As illustrated in FIG. 2, the image reading device 10 includes the reading device 11, a control unit 20, a subject information storage unit 21 (storage unit), a motor control unit 22, a motor 23, the first conveying roller pair 12, and the second conveying roller pair 13.

The reading device 11 reads the image pattern or the like by detecting the reflected light reflected from the subject P in response to irradiating the subject P with the light from the light source, as described above. The reading device 11 includes a light source 11a, a photoelectric conversion element 11b, and an analog front end (AFE) 11c, as illustrated in FIG. 2.

The light source 11a is a light source that irradiates the subject P with the light in order to read the image pattern printed on the subject P. The light source 11a is controlled to be turned on and turned off at an arbitrary timing by a light source turn-on control signal output from the control unit 20. The light source 11a is, for example, a halogen lamp, a rare gas fluorescent lamp (xenon lamp), a light emitting diode (LED), or the like. Note that it is desirable that a single or plurality of LEDs that do not require a dedicated inverter required for turn-on (light emission) are used as the light source 11a as compared with the halogen lamp and the rare gas fluorescent lamp, in order to realize a small size and low power consumption. The rare gas fluorescent lamp generally requires several tens of [ms] to stabilize an amount of light, whereas the LED requires a time less than 1 [ms], and thus has rapid responsiveness to turn-on and turn-off control.

The photoelectric conversion element 11b is an element that receives the reflected light from the subject P and converts the reflected light into an electric signal. The AFE11c is a device that converts the electric signal converted by the photoelectric conversion element 11b into an image signal, which is a digital signal.

The control unit 20 is a control device that controls an entire operation of the image reading device 10. The control unit 20 is realized by, for example, a device such as a processor programmed to execute each function by software, such as a central processing unit (CPU) implemented by an electronic circuit, an application specific integrated circuit (ASIC), a digital signal processor (DSP), a field-programmable gate array (FPGA), a system on a chip (SoC), a graphics processing unit (GPU), or a conventional circuit module. The control unit 20 includes a measurement unit 20*a* and a signal generation unit 20*b*, as illustrated in FIG. 2.

The measurement unit 20*a* measures a time elapsed since the subject P started to be conveyed on the conveying path. The signal generation unit 20*b* generates the light source turn-on control signal for controlling turn-on and turn-off operations of the light source 11*a*.

The subject information storage unit 21 is a storage device that stores position information (subject information) of the image pattern with an arbitrary end portion of the subject P as a reference. In an operation mode (hereinafter referred to as a first operation mode) of prioritizing power saving and lifetime prolongation of the light source 11*a*, the control unit 20 changes and controls a turn-on condition of the light source 11*a* according to the position information of the image pattern on the subject P. In addition, in an operation mode (hereinafter referred to as a second operation mode) of prioritizing a high quality and stability regarding color reproducibility, color stability and the like of a printed image, the control unit 20 performs control to make the turn-on condition of the light source 11*a* constant, regardless of the position information of the image pattern on the subject P.

The motor control unit 22 is a drive circuit that generates a drive signal for rotationally driving the motor 23. The motor 23 is a motor that rotationally drives the first conveying roller pair 12 and the second conveying roller pair 13.

Light Source Turn-on Control in First Operation Mode

Figure 3:
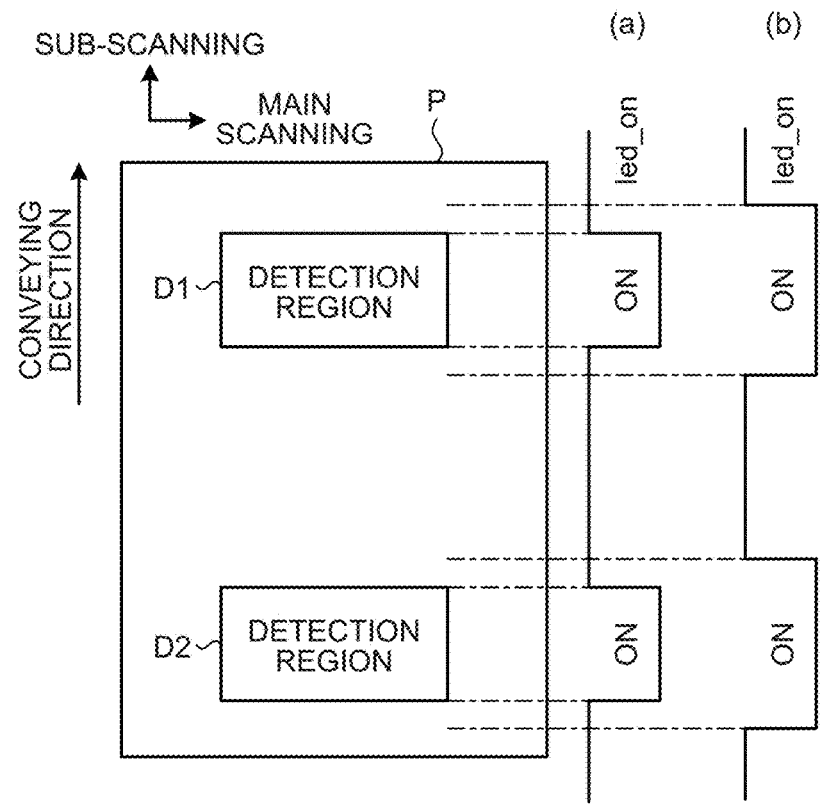
FIG. 3 is a diagram illustrating an example of a timing chart of main signals of light source turn-on control in a first operation mode in the first embodiment.
Figure 4:
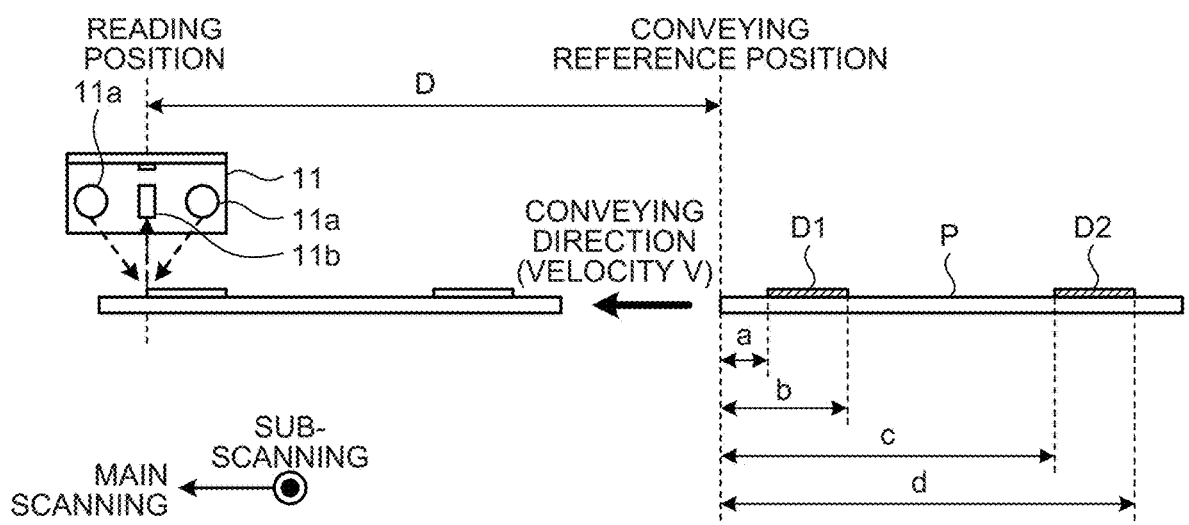
FIG. 4 is a diagram for describing turn-on and turn-off timings in the light source turn-on control in the first operation mode in the first embodiment.

FIG. 3 is a diagram illustrating examples of a timing chart of main signals of light source turn-on control in a first operation mode in the first embodiment. FIG. 4 is a diagram for describing turn-on and turn-off timings in the light source turn-on control in the first operation mode in the first embodiment. The light source turn-on control in the first operation mode in the image reading device 10 will be described with reference to FIGS. 3 and 4.

The subject information storage unit 21 stores the position information of the image pattern of the subject P, as described above, and stores, for example, position information of image patterns of each of detection regions D1 and D2 of the subject P illustrated in FIG. 3. The control unit 20 reads out the position information of the image patterns of the detection regions D1 and D2 stored in the subject information storage unit 21. Then, the signal generation unit 20*b* of the control unit 20 generates a light source turn-on control signal led_on for turning on the light source 11*a* only during a period when each of the detection regions D1 and D2 passes through a reading position of the reading device 11, based on a time from the start of conveyance of the subject P measured by the measurement unit 20*a*. Then, the light source 11*a* performs turn-on and turn-off operations according to the light source turn-on control signal led_on generated by the signal generation unit 20*b*.

In the example illustrated in FIG. 3, two examples (a) and (b) are illustrated as patterns of the light source turn-on control signal. In the pattern (a), turn-on control of the light source 11*a* is performed so that the light source 11*a* irradiates only the detection regions D1 and D2 with light. As a result, the light source 11*a* is turned on only in regions where the irradiation of the light is required, such as the detection regions D1 and D2, and it thus becomes possible to realize power saving and lifetime prolongation of the light source 11*a*. Note that as illustrated in the pattern (b), in order to reliably irradiate the detection regions D1 and D2 with the light, a turn-on period of the light source 11*a* may be extended (have a margin) by a predetermined width before and after a sub-scanning direction.

Next, a turn-on timing and a turn-off timing in a case where the light source 11*a* is controlled by the light source turn-on control signal of the pattern (a) of FIG. 3 will be described with reference to FIG. 4. A conveying velocity of the subject P, a distance from a conveying reference position (conveying start position) to the reading position of the reading device 11, and distances to the detection regions D1 and D2 are determined as follows.

Conveying velocity of subject P: V [mm/s]

Distance from conveying reference position (front end of subject P) to reading position: D [mm]

Distance from front end of subject P to front end of detection region D1: a [mm]

Distance from front end of subject P to rear end of detection region D1: b [mm]

Distance from front end of subject P to front end of detection region D2: c [mm]

Distance from front end of subject P to rear end of detection region D2: d [mm]

From the velocity and the distances described above, in a case where the light source 11*a* is turned on only during the period when each of the detection regions D1 and D2 passes through the reading position and the light source 11*a* is turned off during a period when regions other than the detection regions D1 and D2 pass through the reading position, the turn-on and turn-off timings of the light source 11*a* are calculated as follows. However, a time in a case where the front end of the subject P is at the conveying reference position is 0 [s].

Turn-on timing of detection region D1: $(D+a)/V$ [s]

Turn-off timing of detection region D1: $(D+b)/V$ [s]

Turn-on timing of detection region D2: $(D+c)/V$ [s]

Turn-off timing of detection region D2: $(D+d)/V$ [s]

As such, in the first operation mode, by turning on the light source 11*a* only during at least the period when the detection region passes through the reading position according to the position information of the image pattern stored in the subject information storage unit 21, it is possible to realize the power saving and the lifetime prolongation of the light source 11*a*.

Note that it has been described that the light source 11*a* is turned off during the period when the regions other than the detection regions D1 and D2 pass through the reading position, but the light source 11*a* does not need to be always turned off during this period, and may be controlled to be turned on with a light amount lower than a light amount at the time of reading of the detection regions D1 and D2 by a predetermined ratio while being maintained in a turn-of state.

Light Source Turn-on Control in Second Operation Mode

Figure 5:
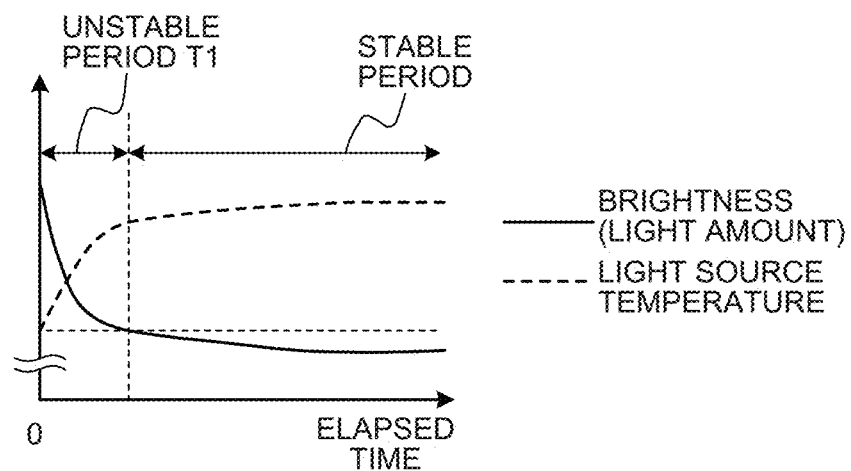
FIG. 5 is a diagram for describing a change in brightness after the start of turn-on of the light source.

FIG. 5 is a diagram for describing a change in brightness after the start of turn-on of the light source. Before describing light source turn-on control in the second operation mode, a change in brightness after the start of turn-on of the light source 11*a* will be described with reference to FIG. 5.

As illustrated in FIG. 5, it has been generally known that brightness of the light source 11*a* is remarkably lowered mainly due to self-heating immediately after the light source 11*a* is turned on and the change in brightness becomes gentle as a rise in a light source temperature gradually approaches a saturated state. Here, as illustrated in FIG. 5, a period in which the change in brightness is not significantly stable immediately after the light source 11*a* is turned on is referred to as an unstable period T1, and a period in which the brightness is stable after the unstable period T1 is referred to as a stable period.

Figure 6:
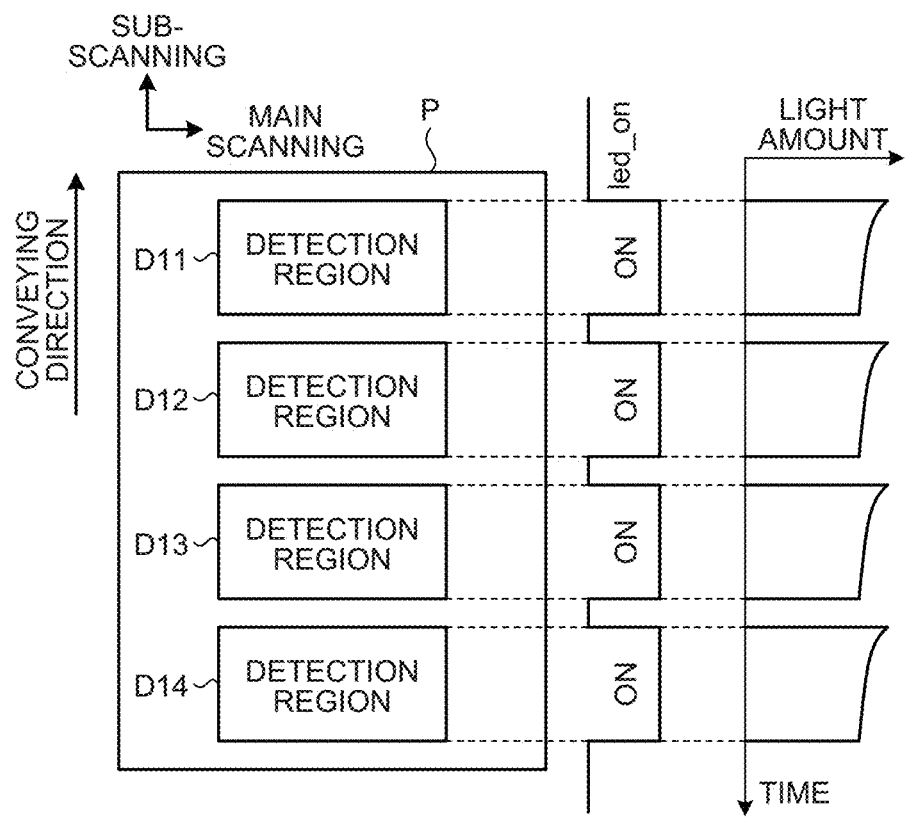
FIG. 6 is a diagram for describing an example of a case where the light source turn-on control in the first operation mode is a demerit.

FIG. 6 is a diagram for describing an example of a case where the light source turn-on control in the first operation mode is a demerit. Next, a case where the turn-on control of the light source 11a by the first operation mode becomes a demerit due to existence of the unstable period T1 in the turn-on of the light source 11a as illustrated in FIG. 5 will be described with reference to FIG. 6.

In the turn-on control of the light source 11a, a case where a high-quality and stable reading operation is required by suppressing a change in the light amount of the light source 11a as much as possible is also conceivable. Therefore, as illustrated in FIG. 6, in a case where detection regions D11 to D14 are arranged on the subject P in an aspect in which an interval therebetween is narrow (for example, an aspect in which an interval therebetween is narrower than an interval between the detection regions D1 and D2 at least illustrated in FIG. 3), when the turn-on control of the light source 11a is performed by the pattern (a) of FIG. 3 in the first operation mode described above, that is, when turn-on and turn-off of the light source 11a are performed so as to correspond to the detection regions D11 to D14 of the subject P, there is a possibility that stability of a reading result will be impaired due to a sudden change in brightness (light amount) accompanying a change in light source temperature in reading periods for the detection regions D11 to D14.

Figure 7:
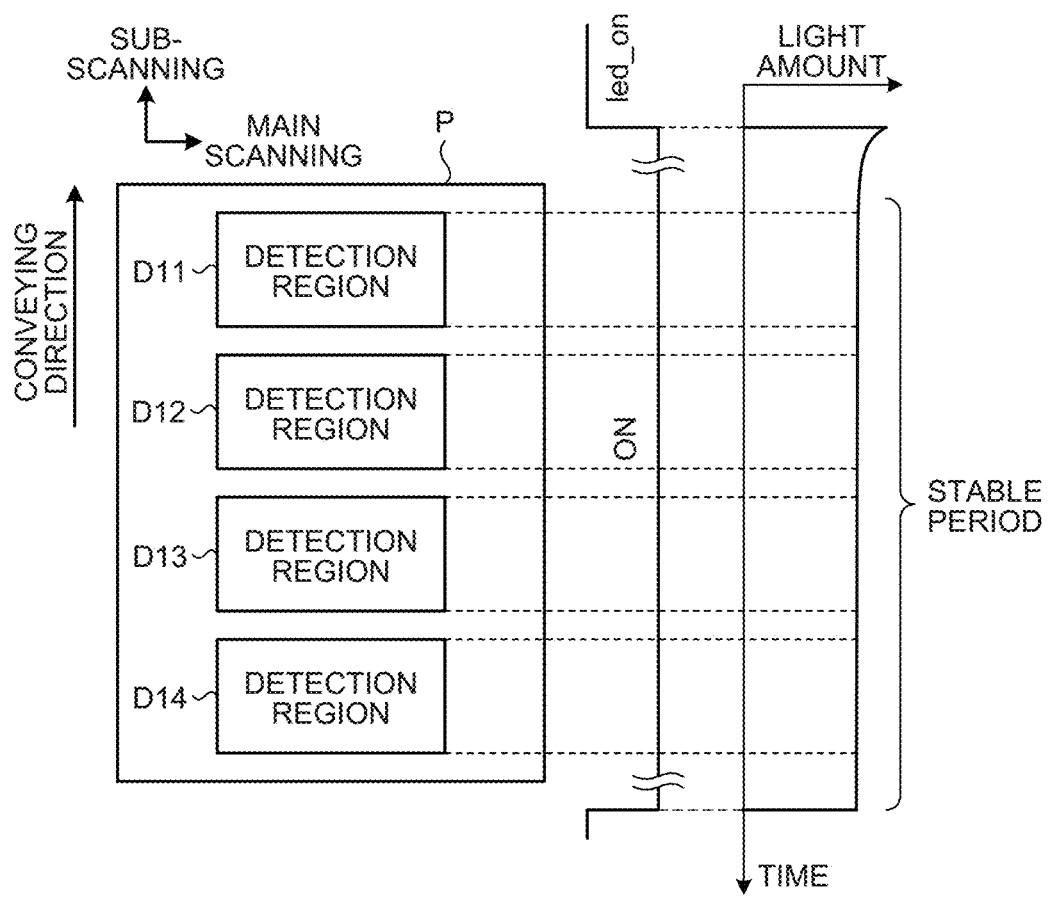
FIG. 7 is a diagram illustrating an example of a timing chart of main signals of light source turn-on control in a second operation mode in the first embodiment.

FIG. 7 is a diagram illustrating examples of a timing chart of main signals of light source turn-on control in a second operation mode in the first embodiment. The light source turn-on control in the second operation mode in the image reading device 10 will be described with reference to FIG. 7.

In order to avoid the demerit in the first operation mode described above in FIG. 6 and realize a high-quality and stable reading operation, the control unit 20 only needs to execute the light source turn-on control by the second operation mode, and read respective detection regions (detection regions D11 to D14) under a predetermined turn-on condition without considering the position information of the image pattern stored in the subject information storage unit 21. Specifically, first, the control unit 20 turns on the light source 11a so that the unstable period T1 has already elapsed until the detection region D11 of the subject P passes through the reading position, as illustrated in FIG. 7. Then, the control unit 20 performs turn-on control so as not to perform an operation of turning off the light source 11a and turning on the light source 11a at all within a period until all of the detection regions D11 to D14 pass through the reading position.

As such, in the second operation mode, by turning on the light source 11a with the turn-on condition constant during a period when the subject P passes through the reading position regardless of the position information of the image pattern stored in the subject information storage unit 21, it is possible to perform the high-quality and stable reading operation.

As described above, the image reading device 10 according to the present embodiment appropriately switches and controls the turn-on condition of the light source 11a with reference to the position information of the image pattern stored in the subject information storage unit 21 in each of the first operation mode and the second operation mode, and it is thus possible to improve comprehensive performance of the image reading device 10 and comprehensively improve the quality of the printed image.

Note that the image reading device 10 may appropriately switch between the first operation mode and the second operation mode based on the image pattern stored in the subject information storage unit 21. For example, the image reading device 10 may switch to the first operation mode in a case where the position information of the image pattern indicates that an interval between the detection regions (regions for reading the image patterns) is larger than a threshold value, and may switch to the second operation mode in a case where the position information of the image pattern indicates that the interval is smaller than the threshold value. Alternatively, in a case where the interval between the detection regions indicated by the position information of the image pattern is larger than the unstable period T1 at the time of turn-on of the light source 11a, the image reading device 10 may determine that the next detection region can be read after the unstable period T1 has elapsed when the light source is turned off and turned on again between the detection region and the detection region, and switch to the first operation mode. Then, in a case where the interval between the detection regions indicated by the position information of the image pattern is smaller than the unstable period T1 at the time of turn-on of the light source 11a, the image reading device 10 may determine that the unstable period T1 does not elapse until the next detection region is read when the light source is turned off and turned on again between the detection region and the detection region, and switch to the second operation mode.

In addition, two operation modes, that is, the first operation mode of prioritizing the power saving and the lifetime prolongation of the light source 11a and the second operation mode of prioritizing the high quality and the stability regarding the color reproducibility, the color stability and the like of the printed image, have been described in the abovementioned embodiment, but the image reading device according to the present invention is not limited thereto. That is, the image reading device may also have other operation modes such as an operation mode of prioritizing reduction of a processing load or an operation mode of prioritizing improvement of a processing velocity.

Second Embodiment

An image reading device according to a second embodiment will be described focusing on a difference from the image reading device 10 according to the first embodiment. In the first embodiment, an operation of the control unit 20 generating the light source turn-on control signal for defining whether to turn on or off the light source 11a based on a time has been described. In the present embodiment, an operation of generating a light source turn-on control signal based on a movement amount of a subject P will be described.

Block Configuration of Image Reading Device

Figure 8:
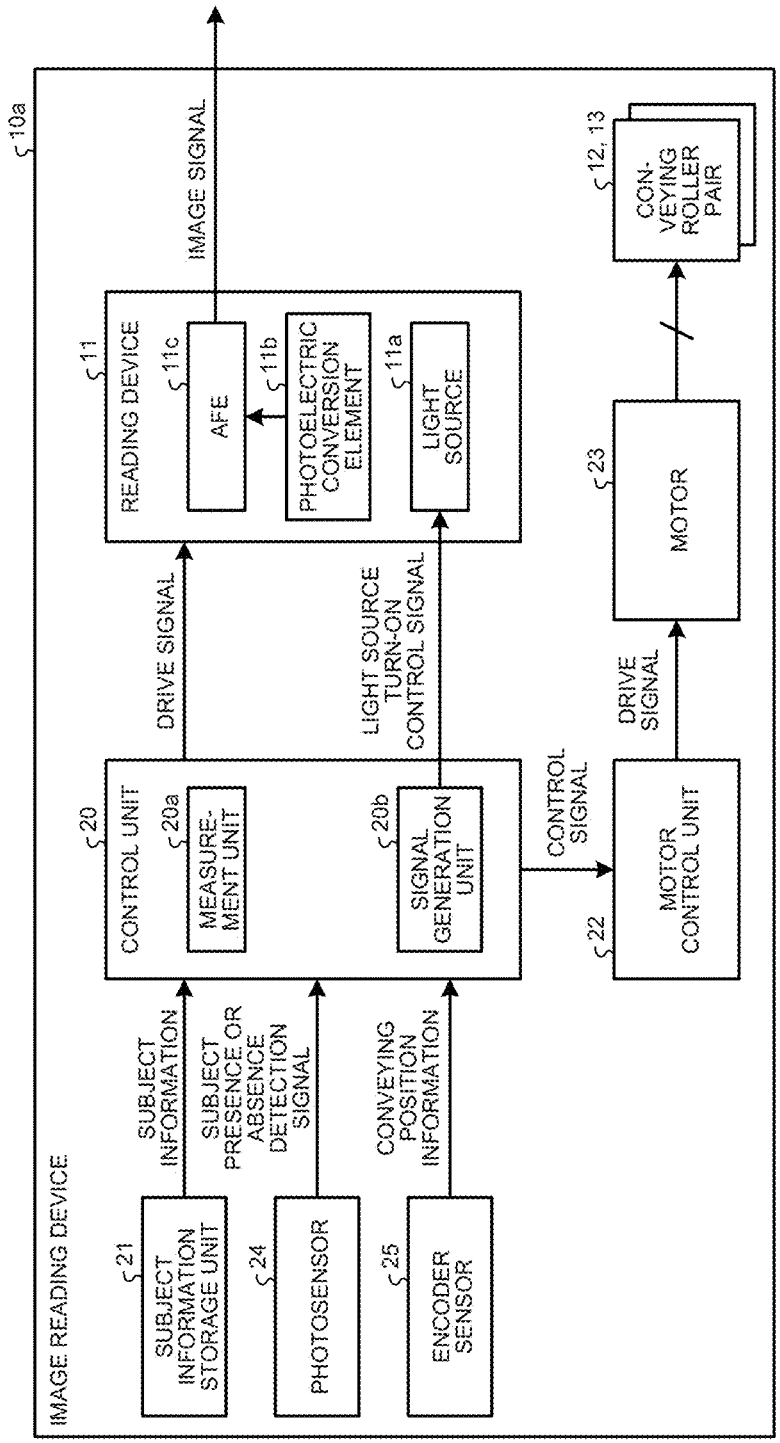
FIG. 8 is a diagram illustrating an example of a block configuration of an image reading device according to a second embodiment.

FIG. 8 is a diagram illustrating an example of a block configuration of an image reading device according to a second embodiment. A block configuration of an image reading device 10a according to the present embodiment will be described with reference to FIG. 8.

As illustrated in FIG. 8, the image reading device 10a includes a reading device 11, a control unit 20, a subject information storage unit 21, a motor control unit 22, a motor 23, a photosensor 24, an encoder sensor 25 (an example of a position detection unit), a first conveying roller pair 12, and a second conveying roller pair 13.

The photosensor 24 is a sensor that detects the presence or absence of a subject P transported on a conveying path. The photosensor 24 outputs a subject presence or absence detection signal as a signal indicating the presence/absence of the subject P.

The encoder sensor 25 is a sensor that measures a relative positional relationship between the subject P and the reading device 11 (reading position). The encoder sensor 25 outputs a pulse signal as conveying position information indicating the relative positional relationship between the subject P and the reading device 11 (reading position).

A measurement unit 20a of the control unit 20 starts measurement of the pulse signal output from the encoder sensor 25 after the subject P is detected by the photosensor 24. A signal generation unit 20b of the control unit 20 generates a light source turn-on control signal for controlling turn-on and turn-off of a light source 11a based on the pulse signal measured by the measurement unit 20a.

Note that operations of the other blocks illustrated in FIG. 8 are as described above in the first embodiment.

Schematic Structure of Image Reading Device

Figure 9:
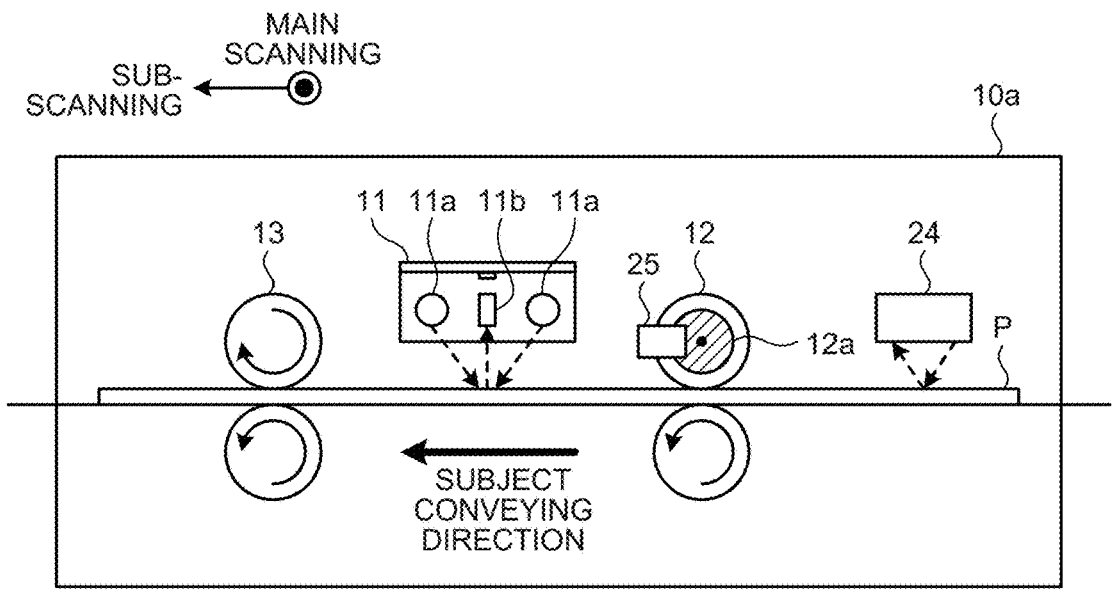
FIG. 9 is a diagram illustrating an example of a schematic structure of the image reading device according to the second embodiment.

FIG. 9 is a diagram illustrating an example of a schematic structure of the image reading device according to the second embodiment. A schematic configuration of the image reading device 10a according to the present embodiment will be described with reference to FIG. 9.

The image reading device 10a includes the reading device 11, the first conveying roller pair 12, an encoder disk 12a, the second conveying roller pair 13, the photosensor 24, and the encoder sensor 25, as illustrated in FIG. 9. Note that although not illustrated in FIG. 9, the image reading device 10a further includes conveying guide plates 14 and 15 and a reference member 16.

The photosensor 24 is arranged on an upstream side of the conveying path with respect to the reading device 11 and the first conveying roller pair 12, detects that the subject P exists from after a front end of the subject P reaches a detection position of the photosensor 24 until a rear end of the subject P passes through the detection position, and detects that the subject P does not exist otherwise.

The encoder sensor 25 outputs the pulse signal by detecting the presence or absence of a large number of slits provided in the encoder disk 12a provided on a rotation shaft of the first conveying roller pair 12.

Light Source Turn-on Control

Figure 10:
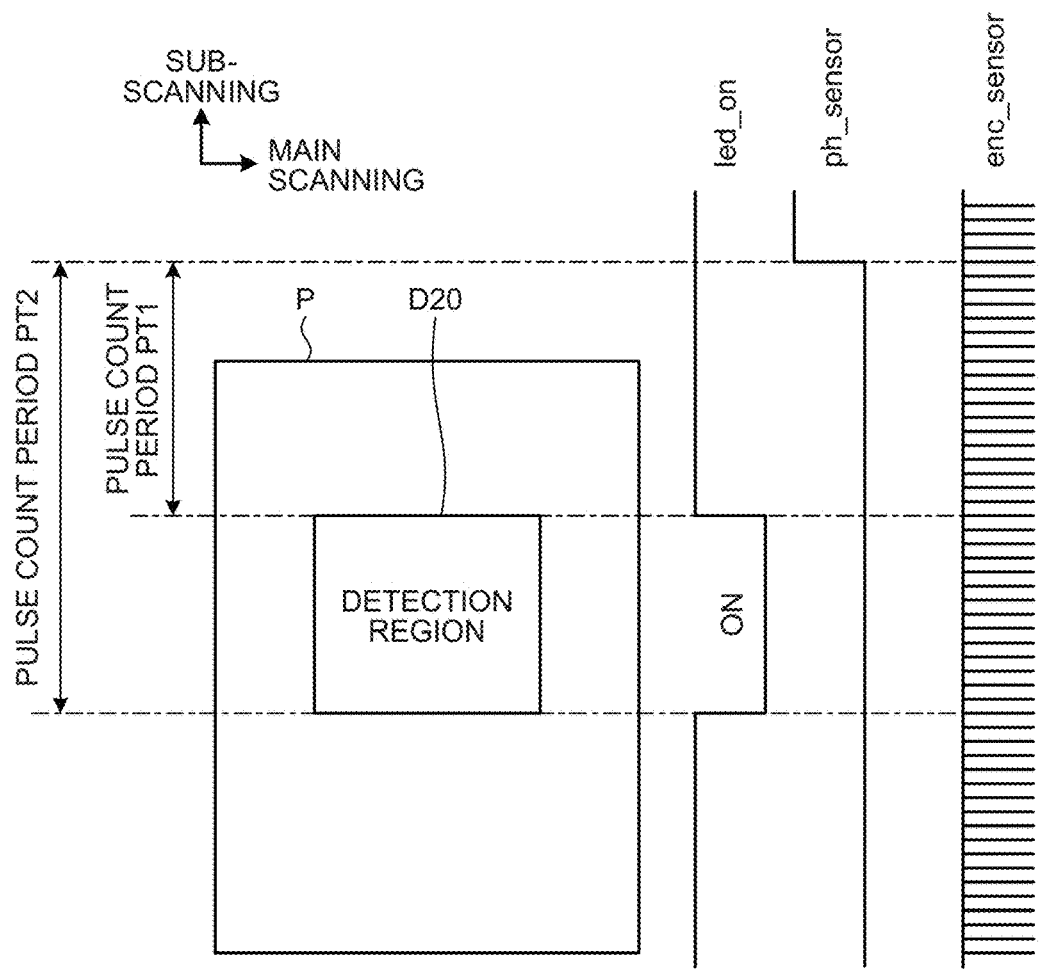
FIG. 10 is a diagram illustrating an example of a timing chart of main signals of light source turn-on control in the second embodiment.

FIG. 10 is a diagram illustrating an example of a timing chart of main signals of light source turn-on control in the second embodiment. Light source turn-on control in the image reading device 10a will be described with reference to FIG. 10. Here, the light source turn-on control is light source turn-on control in the first operation mode.

The photosensor 24 outputs a subject detection signal ph_sensor that changes depending on the presence or absence of the subject P, as described above, to the control unit 20. The encoder sensor 25 outputs a pulse signal enc_sensor according to a rotation amount of the encoder disk 12a, as described above.

Then, the measurement unit 20a of the control unit 20 starts the measurement of the pulse signal output from the encoder sensor 25 after the subject P is detected by the photosensor 24, as described above. In addition, the signal generation unit 20b of the control unit 20 generates a light source turn-on control signal led_on for controlling the turn-on and the turn-off of the light source 11a based on the pulse signal measured by the measurement unit 20a.

Specifically, the control unit 20 starts the turn-on of the light source 11a by the light source turn-on control signal at a timing when the reading position of the reading device 11 has reached a front end position, in a sub-scanning direction, of a detection region D20 including an image pattern illustrated in FIG. 10 (timing when a pulse count period PT1 has elapsed), after the subject P is detected by the photosensor 24, based on a measurement result of the pulse signal measured by the measurement unit 20a. Here, the pulse count period PT1 only needs to be determined, for example, based on a distance from a front end position of the subject P in the sub-scanning direction to the front end position of the detection region D20 in the sub-scanning direction.

Similarly, the control unit 20 turns off the light source 11a by the light source turn-on control signal at a timing when the reading position of the reading device 11 has reached a rear end position of the detection region D20 in the sub-scanning direction (timing when a pulse count period PT2 has elapsed), after the subject P is detected by the photosensor 24, based on the measurement result of the pulse signal measured by the measurement unit 20a. Here, the pulse count period PT2 only needs to be determined, for example, based on a distance from the front end position of the subject P in the sub-scanning direction to the rear end position of the detection region D20 in the sub-scanning direction.

Here, for example, in a case where the control unit 20 performs the light source turn-on control by the light source turn-on control signal based on a time with the timing when the subject P is detected by the photosensor 24 as a starting point, there is a possibility that an execution delay for interrupt will occur depending on a processing load of the control unit 20 or a variation will occur in turn-on and turn-off timings of the light source 11a due to an influence of an error (variation) of a built-in timer. Further, a conveying velocity of the subject P is not necessarily constant depending on a type of the subject P and components constituting the conveying path. For this reason, the light source turn-on control of the light source 11a in which the various fluctuation factors described above are considered is required, and in a product that requires a high velocity and a high productivity in a commercial printing market, it becomes extremely difficult to establish the light source turn-on control.

Therefore, the image reading device 10a according to the present embodiment controls the turn-on and turn-off timings of the light source 11a necessary for reading the detection region including the image pattern of the subject P, based on the movement amount of the subject P in the sub-scanning direction, as described above. As a result, since this control manner is a control manner based on the movement amount in the sub-scanning direction, highly accurate and highly stable control can be realized without being affected by the processing load of the control unit 20 and the conveying velocity of the subject P in the conveying path. Resultantly, in the first operation mode, in a case where it is not necessarily required to irradiate the entire surface of the subject P with light by the light source 11a, it becomes possible to perform control for irradiating only a required region (detection region) of the image pattern with the light with high accuracy, and it resultantly becomes possible to achieve effects of power saving and lifetime prolongation of the light source 11a.

Third Embodiment

An image reading device according to a third embodiment will be described focusing on a difference from the image reading device 10a according to the second embodiment. In the second embodiment, the control for performing the turn-on of the light source 11a for only the detection region in the subject P has been described. In the present embodiment, light source turn-on control in which a change in brightness after a light source 11a is turned on is considered will be described. Note that a structure and a block configuration of an image reading device according to the present embodiment are similar to those of the image reading device 10a according to the second embodiment.

Light Source Turn-on Control in First Operation Mode

Figure 11:
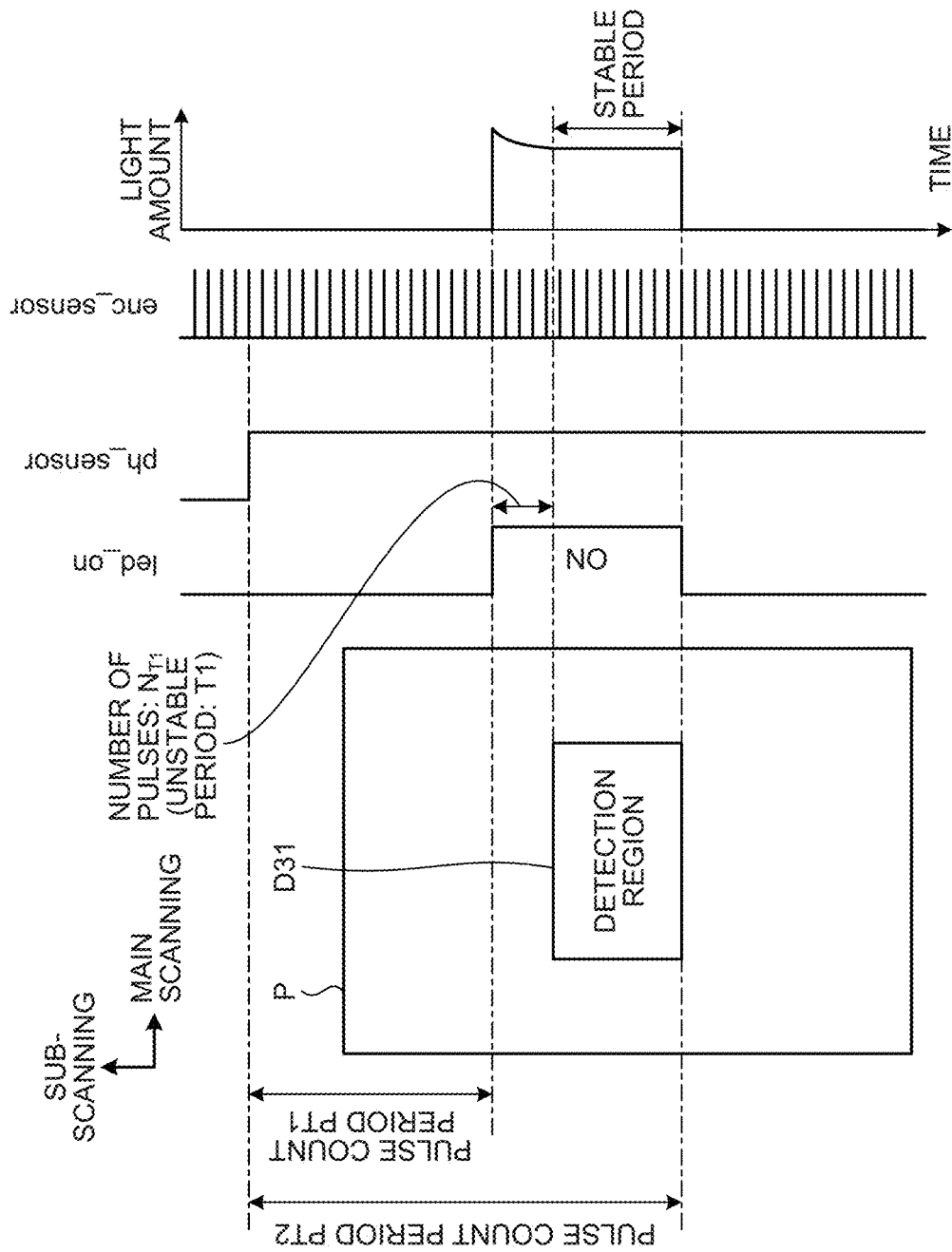
FIG. 11 is a diagram illustrating an example of a timing chart of main signals of light source turn-on control in a first operation mode in a third embodiment.

FIG. 11 is a diagram illustrating examples of a timing chart of main signals of light source turn-on control in a first operation mode in the third embodiment. The light source turn-on control in the first operation mode in the image reading device according to the present embodiment will be described with reference to FIG. 11.

As described above in FIG. 5, it has been generally known that brightness of the light source 11a is remarkably lowered mainly due to self-heating immediately after the light source 11a is turned on and the change in brightness becomes gentle as a rise in a light source temperature gradually approaches a saturated state. A change amount in a temperature and a change amount in brightness accompanying the change amount in the temperature differ depending on component specifications of the light source 11a, but a time until the brightness stabilizes within a range in which there is no problem in actual use is considered as the unstable period T1 as described above.

In the present embodiment, the control unit 20 controls the unstable period T1 illustrated in FIG. 5 by converting the unstable period T1 into the number $N_{T1}$ of pulses of the pulse signal output from the encoder sensor 25. In this case, assuming that a conveying velocity of the subject P is V [mm/s] and the unstable period is T1 [s], a distance DT1 required from after the light source 11a is turned on until the brightness stabilizes is calculated by the following Equation (1).

$$DT1[mm]=V \times T1 \quad (1)$$

In addition, assuming that a moving distance between pulses of the pulse signal output from the encoder sensor 25 is d [mm], the number NT1 of pulses required from after the light source 11a is turned on until the brightness stabilizes is calculated by the following Equation (2).

$$NT1=DT1/d \quad (2)$$

Therefore, the control unit 20 only needs to perform control so that a distance obtained by subtracting a distance corresponding to the number NT1 of pulses from a conveying distance of the subject P from a position at which the subject P is detected by the photosensor 24 until the reading position of the reading device 11 reaches a front end position of a detection region D31 in the sub-scanning direction corresponds to a pulse count period PT1, as illustrated in FIG. 11.

Note that as illustrated in FIG. 11, a turn-off timing of the light source 11a by the control unit 20 is a timing at which a lower end of the detection region D31 in the sub-scanning direction reaches the reading position of the reading device 11, but an operation is not limited thereto, and may be an operation of turning off the light source 11a on a downstream side of the detection region D31 in the sub-scanning direction.

Light Source Turn-on Control in Second Operation Mode

Figure 12:
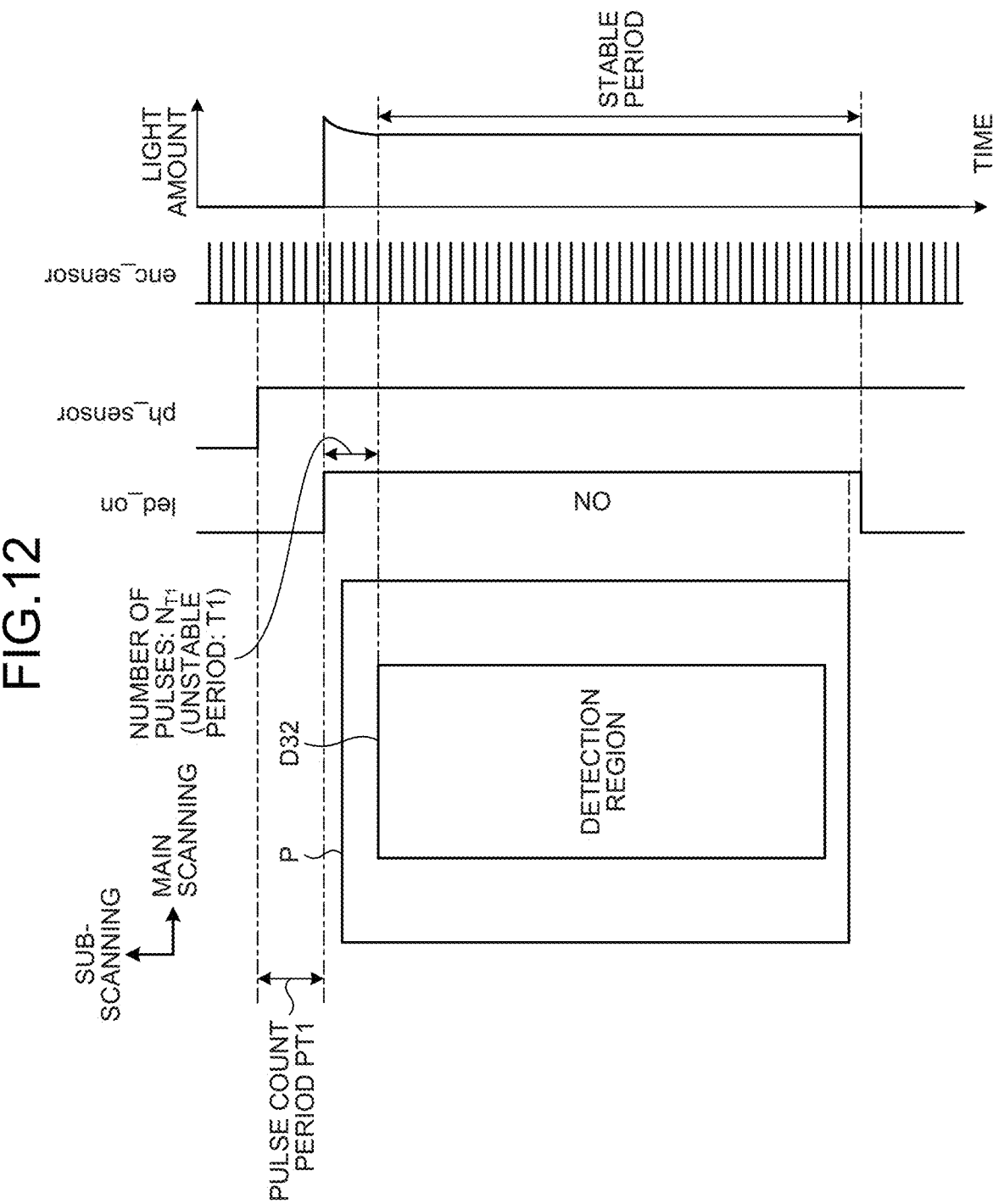
FIG. 12 is a diagram illustrating an example of a timing chart of main signals of light source turn-on control in a second operation mode in the third embodiment.

FIG. 12 is a diagram illustrating examples of a timing chart of main signals of light source turn-on control in a second operation mode in the third embodiment. The light source turn-on control in the second operation mode in the image reading device according to the present embodiment will be described with reference to FIG. 12.

The light source turn-on control (turn-on of the light source 11a on an upstream side of the detection region of the subject P and turn-off of the light source 11a on a lower end (downstream) of the detection region) in the first operation mode described above in FIG. 11 can also be applied to the second operation mode.

For example, as illustrated in FIG. 12, in a case where a width of the detection region D32 in the sub-scanning direction occupies almost the entire region of the subject P, it is difficult to secure the unstable period T1 on the subject P, and a turn-on start timing of the light source 11a is outside the subject P (before an upper end of the subject P in the sub-scanning direction reaches the reading position). However, the reason why the turn-on of the light source 11a is started outside the subject P is to stabilize the brightness of the light source 11a as described above, such that there is no particular problem.

Further, the turn-off timing of the light source 11a does not need to be necessarily aligned with a lower end of the detection region D32 in the sub-scanning direction, and may be outside the subject P (after the lower end of the subject P in the sub-scanning direction has passed through the reading position) in order to simplify the control by the control unit 20.

From the above, the light source turn-on control in the first operation mode described above in FIG. 10 can also be applied in the second operation mode.

As described above, the image reading device according to the present embodiment performs control to start the turn-on of the light source 11a at a position on an upstream side from the front end of the detection region of the subject P in the sub-scanning direction by a distance corresponding to the unstable period T1. That is, the control unit 20 performs the turn-on control of the light source 11a so that the image pattern (detection region) on the subject P reaches the reading position of the reading device 11 after a predetermined time (for example, the unstable period T1) has elapsed since the turn-on of the light source 11a has been started. Such turn-on control can be applied to both the first operation mode and the second operation mode. As described above, there is a characteristic of the light source 11a of which temperature change is large and changes in light source brightness and an emission spectrum are also large from immediately after the light source 11a is turned on until a predetermined time elapses, but the image reading device according to the present embodiment sets a period in which such a change in brightness or the like is drastic as the unstable period T1 and performs the light source turn-on control so that the reading of the detection region is not performed in the unstable period T1, and can thus realize the high quality and the stability and realize the power saving and the lifetime prolongation of the light source 11a.

Fourth Embodiment

An image reading device according to a fourth embodiment will be described focusing on a difference from the image reading device according to the third embodiment. In the third embodiment, the light source turn-on control in which general characteristics of the change in brightness from the turn-on start of the light source 11a are considered has been described. In the present embodiment, light source turn-on control in a case where characteristics change due to a change in temperature around the light source 11a will be described. Note that a structure and a block configuration of an image reading device according to the present embodiment are similar to those of the image reading device 10a according to the second embodiment.

Figure 13:
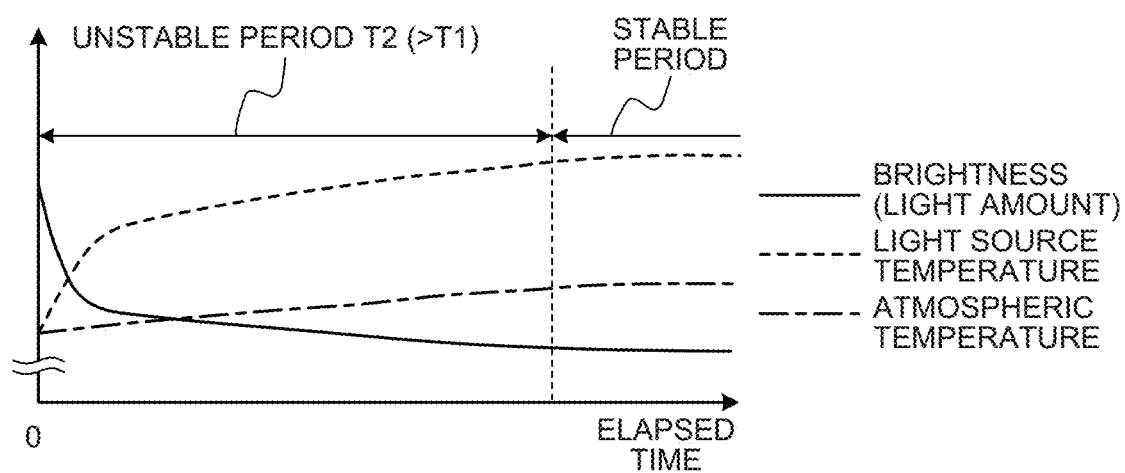
FIG. 13 is a diagram for describing a change in brightness after the start of turn-on of a light source affected by a change in atmospheric temperature.

Characteristic Change of Light Source Under Influence of Change in Atmospheric Temperature FIG. 13 is a diagram for describing a change in brightness after the start of turn-on of a light source affected by a change in atmospheric temperature. A characteristic change of the light source 11a under an influence of a change in atmospheric temperature will be described with reference to FIG. 13.

In a case where there is a rise in an atmospheric temperature of the light source 11a due to operations of peripheral components, or the like, as well as self-heating of the light source 11a, the light source 11a is affected by a change in atmospheric temperature (in a case where a temperature rises in an example illustrated in FIG. 13) as illustrated in FIG. 13, such that it may take time for a light source temperature to be saturated (unstable period T2>T1), and sufficient reading performance by the reading device 11 may not be obtained in the unstable period T1 illustrated in FIG. 5. Light source turn-on control for coping with such a problem will be described later with reference to FIGS. 14 and 15.

Block Configuration of Image Reading Device

Figure 14:
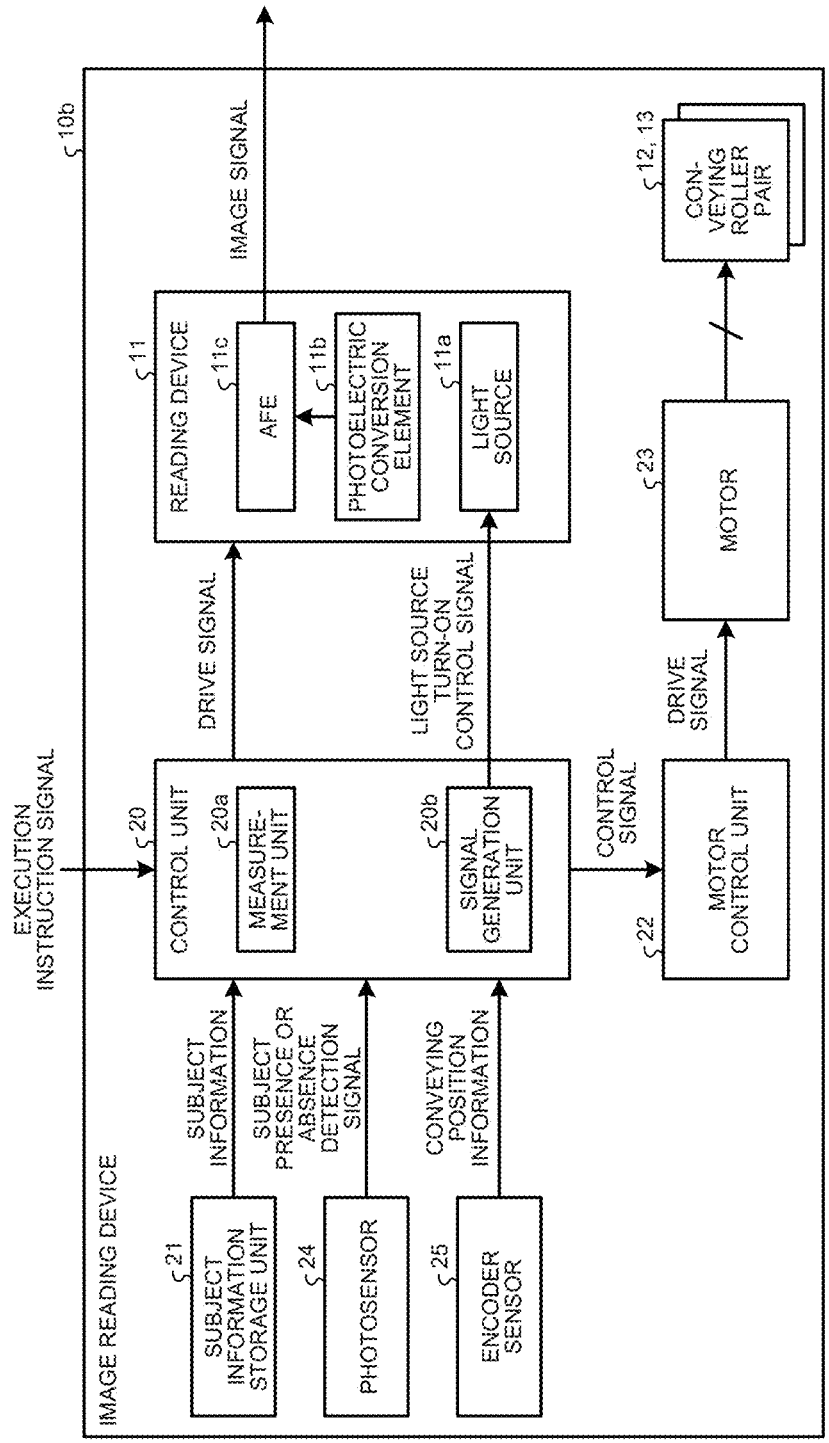
FIG. 14 is a diagram illustrating an example of a block configuration of an image reading device according to a fourth embodiment.

FIG. 14 is a diagram illustrating an example of a block configuration of an image reading device according to a fourth embodiment. A block configuration of the image reading device 10b according to the present embodiment will be described with reference to FIG. 14.

As illustrated in FIG. 14, a block configuration of the image reading device 10b is similar to the block configuration of the image reading device 10a according to the second embodiment illustrated in FIG. 8. However, a control unit 20 has an interface for receiving an external signal, and receives an execution instruction signal, which is an external signal, via the interface, as illustrated in FIG. 14.

A signal generation unit 20b of the control unit 20 generates a light source turn-on control signal for turning on a light source 11a, after receiving the execution instruction signal via the interface described above. For example, in a case where the image reading device 10b receives a command to start an image reading operation by a command from the outside, an execution instruction signal is input from the outside to the control unit 20. That is, the control unit 20 turns on the light source 11a after the image reading device 10b starts the image reading operation.

Light Source Turn-on Control

Figure 15:
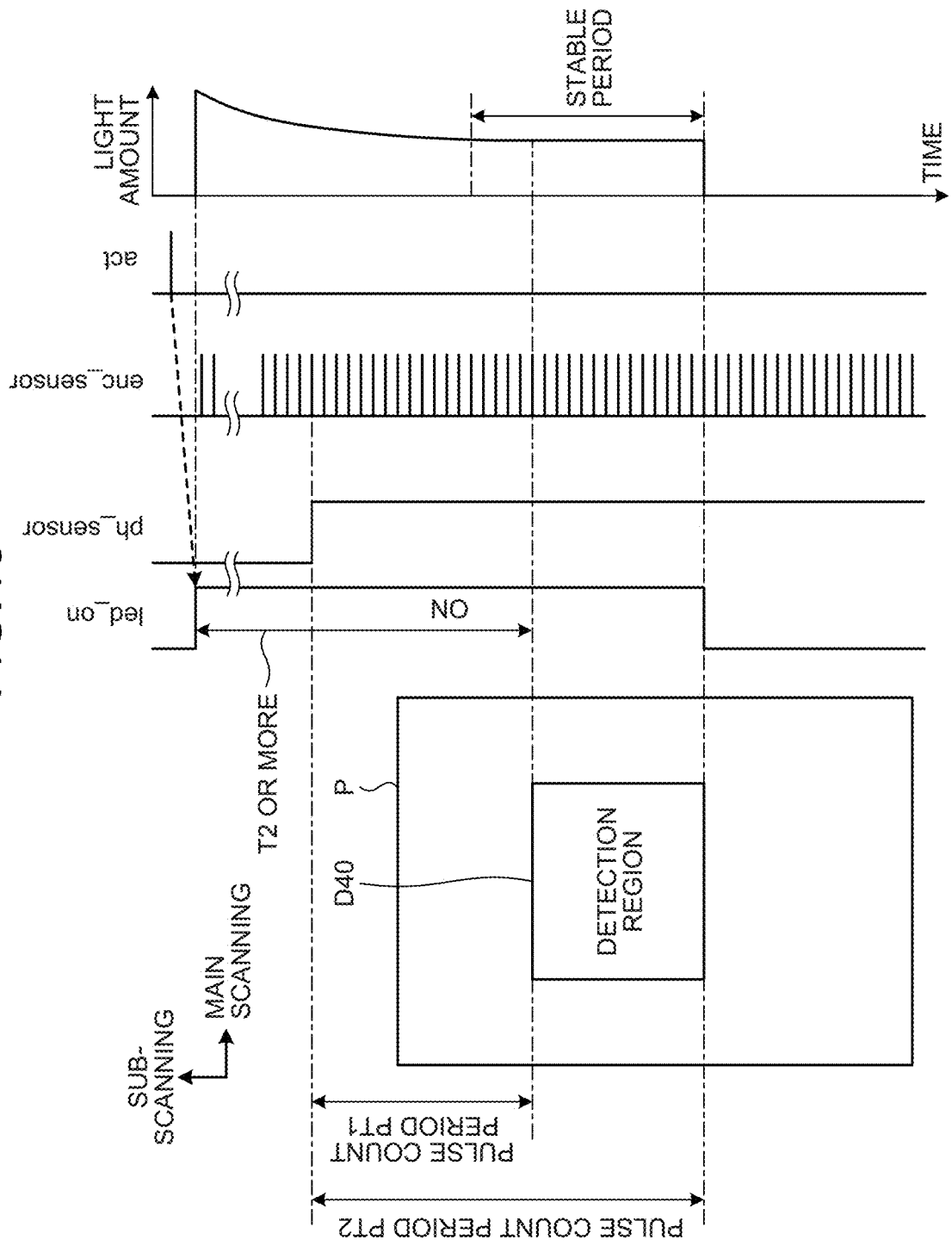
FIG. 15 is a diagram illustrating an example of a timing chart of main signals of light source turn-on control in the fourth embodiment.

FIG. 15 is a diagram illustrating an example of a timing chart of main signals of light source turn-on control in the fourth embodiment. Light source turn-on control in the image reading device 10b will be described with reference to FIG. 15.

In the image reading device 10b according to the present embodiment, as illustrated in FIG. 15, the light source 11a is started to be turned on by a light source turn-on control signal led_on at a timing when an execution instruction signal act has been input (valid) to the control unit 20. The subsequent operations of the image reading device 10b are similar to those of the second embodiment and the third embodiment.

Note that an operation in the first operation mode is illustrated in FIG. 15 by way of example, but the control is not limited thereto, can also be applied to the second operation mode, and may be control for turning off the light source 11a after the subject P has passed through the reading position of the reading device 11.

As described above, the image reading device 10b can read a detection region D40 and can perform reading with high stability, in a state in which a light source temperature of the light source 11a is sufficiently saturated, by starting the turn-on of the light source 11a after receiving the external execution instruction signal.

Note that the execution instruction signal has been input to the control unit 20 in a case where the image reading operation by the image reading device 10b has been started in the above description, but the present invention is not limited thereto. For example, an input timing of the execution instruction signal may be any timing as long as it is a timing at which the unstable period T2 illustrated in FIG. 13 sufficiently elapses before the reading of the detection region of the subject P by the reading device 11 is started.

Fifth Embodiment

An image reading device according to a fifth embodiment will be described focusing on a difference from the image reading device 10a according to the second embodiment. In the second embodiment, the light source turn-on control for the turn-on and the turn-off of the light source 11a for reading the detection region of the subject P in the first operation mode has been described. In the present embodiment, a case where detection of an end portion of the subject P or an end portion of a detection region (region including an image pattern) on the subject P is performed in the first operation mode will be described. Note that a structure and a block configuration of an image reading device according to the present embodiment are similar to those of the image reading device 10a according to the second embodiment.

Figure 16:
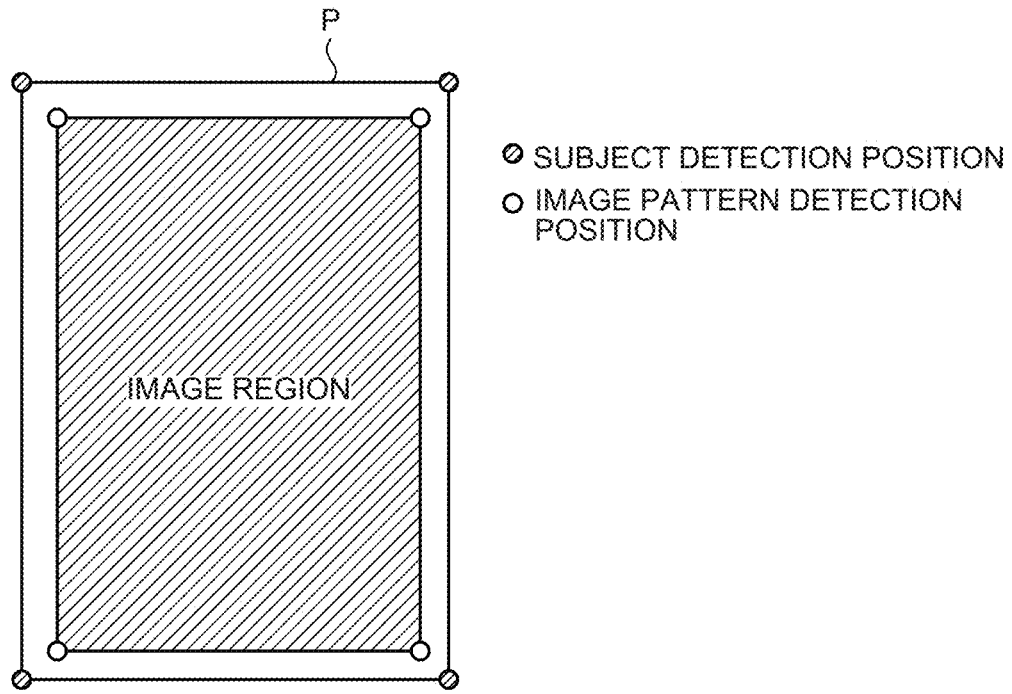
FIG. 16 is a diagram for describing an outline of detection of positions of an end portion of a subject and an image pattern.
Figure 17:
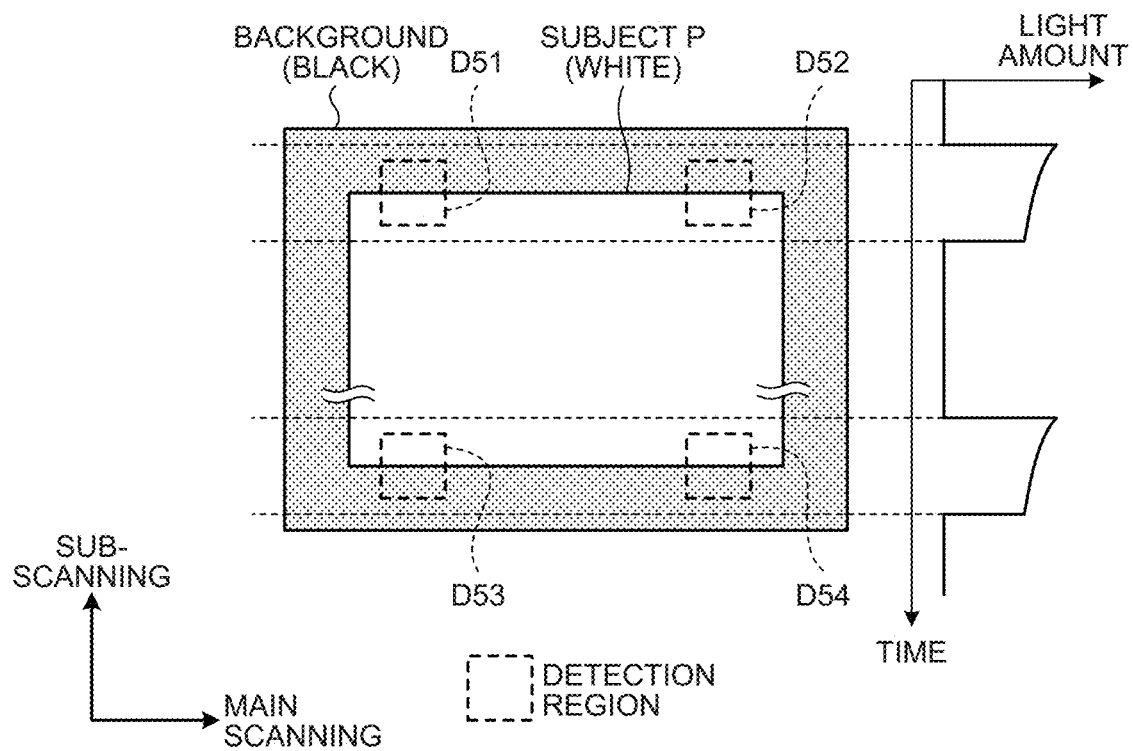
FIG. 17 is a diagram for describing a detection operation of a position of an end portion of a subject in a sub-scanning direction in a fifth embodiment.
Figure 18:
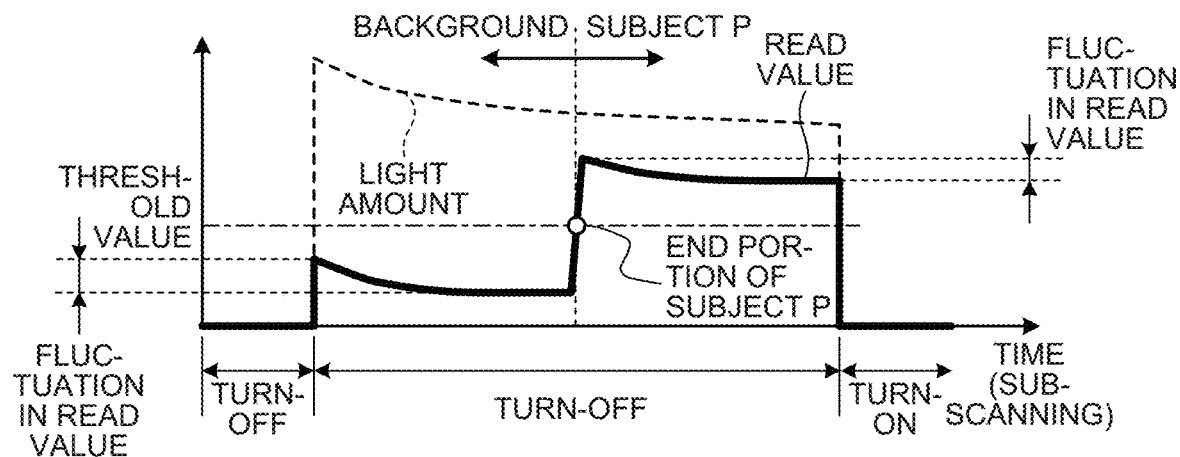
FIG. 18 is a diagram for describing a fluctuation in a read value of the position of the end portion of the subject in the sub-scanning direction in the fifth embodiment.

Detection Operation of End Portion of Subject or End Portion of Detection Region FIG. 16 is a diagram for describing an outline of detection of positions of an end portion of a subject and an image pattern. FIG. 17 is a diagram for describing a detection operation of a position of an end portion of a subject in a sub-scanning direction in a fifth embodiment. FIG. 18 is a diagram for describing a fluctuation in a read value of the position of the end portion of the subject in the sub-scanning direction in the fifth embodiment. An operation of detecting the end portion of the subject P or the end portion of the detection region on the subject P will be described with reference to FIGS. 16 to 18.

As illustrated in FIG. 16, in the image reading device, there is a demand to detect an outer shape of the subject P or an outer shape of the image region on which the image pattern on the subject P is printed. For example, a technology of detecting coordinates of four corners of the subject P by detecting the positions of the end portions of the subject P, as illustrated in FIG. 16, using the reading device 11, to estimate the outer shape of the subject P has already been disclosed. In addition, it is possible to specify coordinates of four corners of an image region (detection region) of the subject P by detecting end portions of the image region, as illustrated in FIG. 16, using the reading device 11, to estimate the outer shape of the image region, by a similar method. Hereinafter, in the image reading device according to the present embodiment, an operation of detecting the positions of the end portions of the subject P in the first operation mode by the control unit 20 will be described.

FIG. 17 illustrates a state of a case where a substantially black (high density) member (reference member 16 in FIG. 1) that becomes a background is arranged at a position facing the reading device 11 and a substantially white (low density) subject P is read. The image reading device according to the present embodiment performs light source turn-on control for enabling a reading operation in the sub-scanning direction for detection regions D51 to D54 including positions of end portions of substantially four corners of the subject P in the sub-scanning direction, in order to detect the positions of the end portions of the substantially four corners of the subject P in the sub-scanning direction. In addition, regarding the light source turn-on control signal, the control unit 20 assumes that a light amount during a turn-on period of the light source 11a is not constant and decreases from the start of the turn-on of the light source 11a to turn-off of the light source 11a, as illustrated in FIG. 17, in a case where a reading operation for each detection region (detection regions D51 to D54) is performed by the reading device 11.

FIG. 18 illustrates a graph illustrating a fluctuation in a read value in a time direction (sub-scanning direction) when the detection region D51 or the detection region D52 is read in a case where the light source turn-on control is performed by the control unit 20 as described above. As described above, the light amount during the turn-on period of the light source 11a gradually decreases, and thus, a light amount read by the reading device 11 also fluctuates (decreases) accordingly. However, if a purpose is simply to detect the end portion of the subject P, an intersection between a predetermined threshold value and a graph portion changing from the background (black) to the subject P (white) can be easily detected as the end portion of the subject P, as illustrated in FIG. 18. Therefore, even though the fluctuation in the read value is generated to some extent, an influence on the detection operation of the end portion of the subject P is small.

Note that the detection of the position of the end portion of the subject P has been described in FIG. 18, but a position of an end portion of the image pattern (detection region) on the subject P can also be detected by a method similar to that described above.

As described above, in the image reading device according to the present embodiment, it is possible to realize power saving and lifetime prolongation of the light source 11a by applying the first operation mode in the detection of the position of the end portion of the subject P or the position of the end portion of the image pattern (detection region) on the subject P.

Sixth Embodiment

In the present embodiment, an operation of reading an image pattern formed on the subject P at a plurality of densities will be described. Note that an image reading device according to the present embodiment has, for example, a configuration similar to that of the image reading device 10a according to the second embodiment.

Subject on which Image Pattern is Formed at a Plurality of Densities

Figure 19:
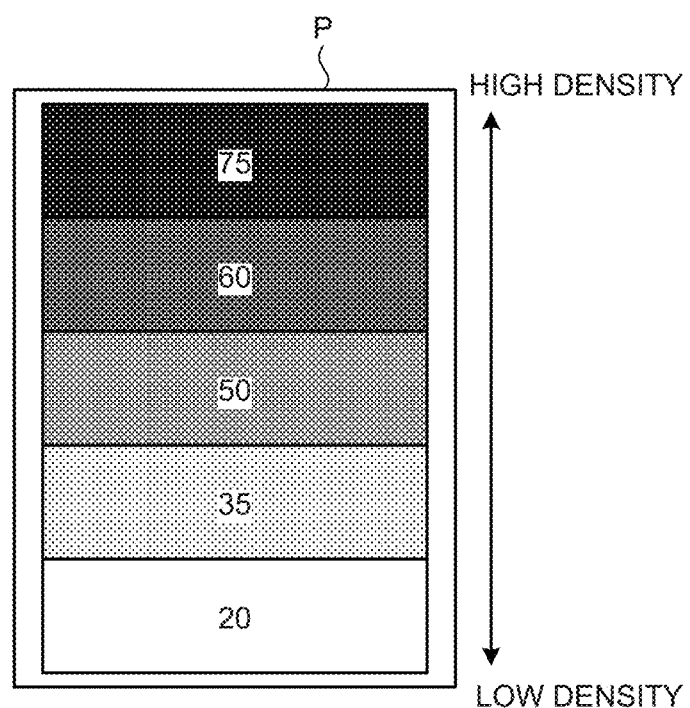
FIG. 19 is a diagram illustrating an example of a subject on which an image pattern having a plurality of densities is printed.

FIG. 19 is a diagram illustrating an example of a subject on which an image pattern having a plurality of densities is printed. A subject P on which an image pattern is formed (printed) at a plurality of densities will be described with reference to FIG. 19.

A technology for detecting density information of an image pattern by reading a predetermined image pattern on the subject P using the reading device 11 has been known. For example, as illustrated in FIG. 19, image patterns having densities of a plurality of gradations are arranged at predetermined intervals, and are applied to correction of a printing condition (density condition of a toner, an ink or the like) of the subject based on read values of all gradations. In an example of a subject P illustrated in FIG. 19, an image pattern having densities of five gradations such as 75 [%], 60 [%], 50 [%], 35 [%], and 20 [%] from an upper side of a paper is printed. Note that a device of performing printing (image forming) on the subject P may be an image forming device provided with the image reading device according to the present embodiment or may be another image forming device.

Detection Operation of Image Pattern Having a Plurality of Densities

Figure 20:
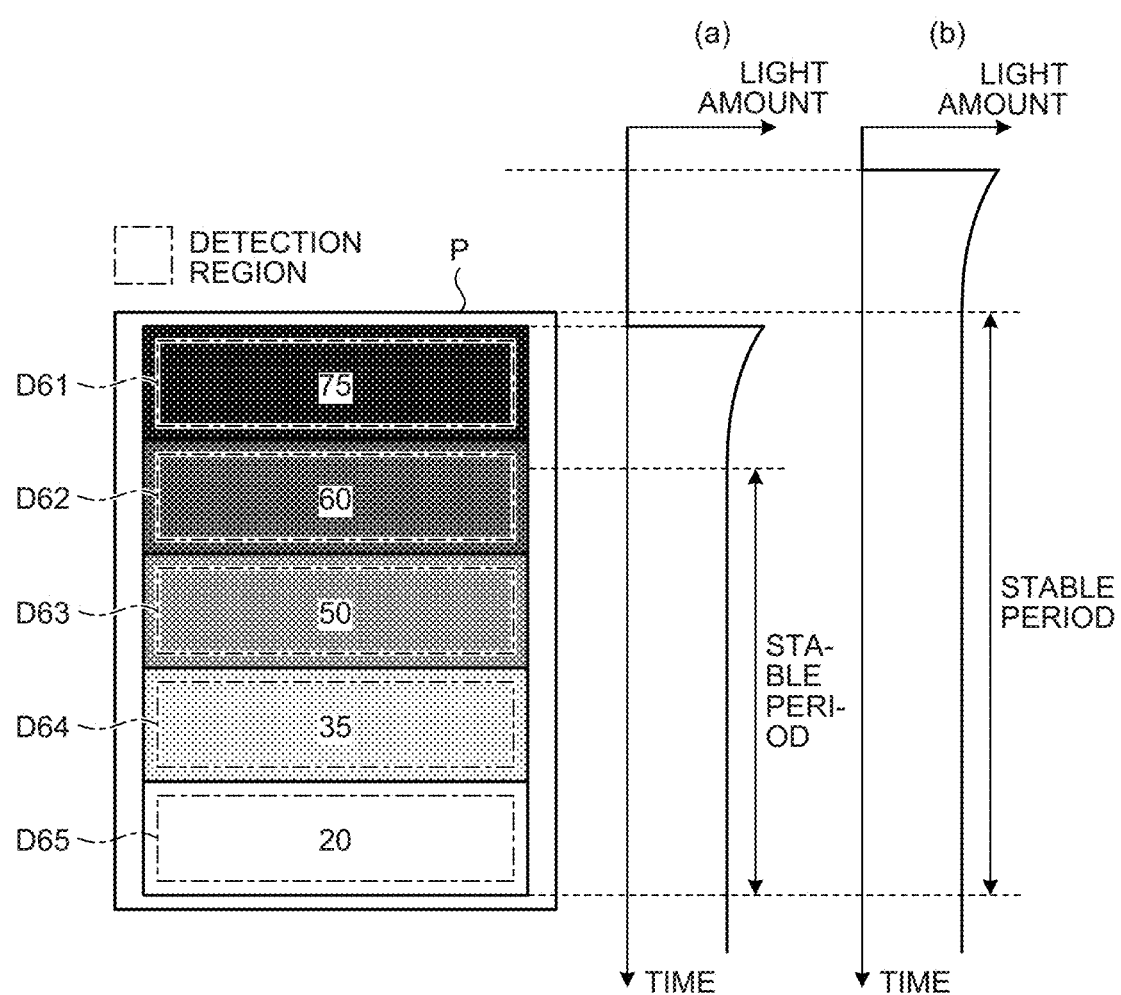
FIG. 20 is a diagram illustrating an application example of a first operation mode and a second operation mode when detecting the image pattern having the plurality of densities.
Figure 21:
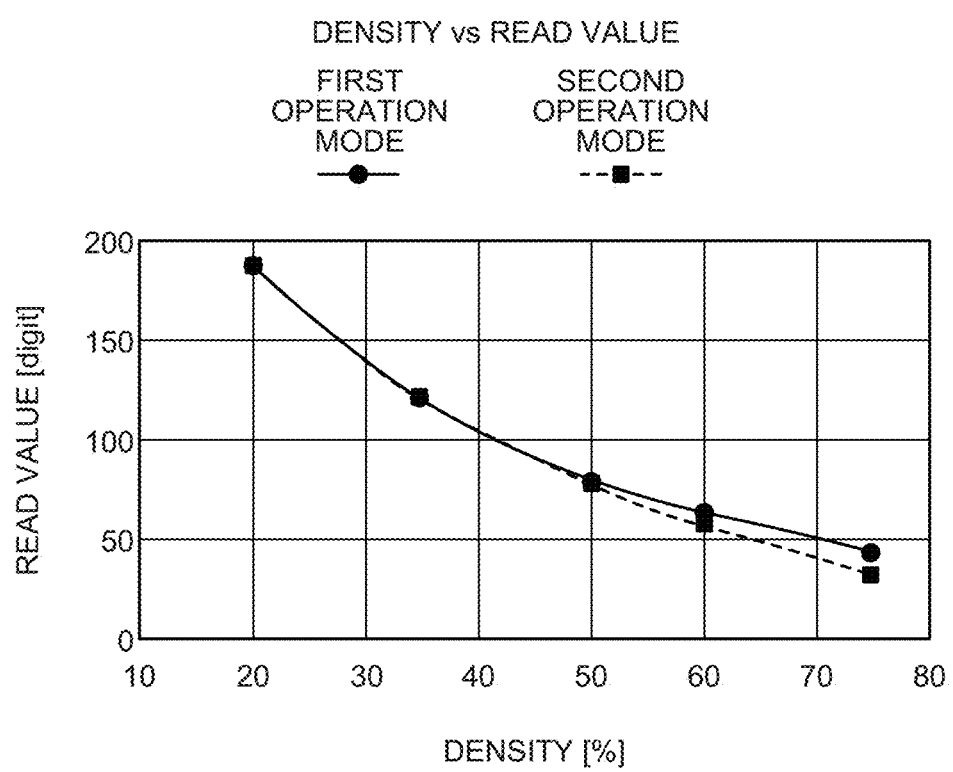
FIG. 21 is a diagram illustrating an example of a graph of read values for each density in the first operation mode and the second operation mode.

FIG. 20 is a diagram illustrating an application example of a first operation mode and a second operation mode when detecting the image pattern having the plurality of densities. FIG. 21 is a diagram illustrating an example of a graph of read values for each density in the first operation mode and the second operation mode. An operation of detecting an image pattern having a plurality of densities in each of the first operation mode and the second operation mode will be described with reference to FIGS. 20 and 21.

(a) of FIG. 20 is a graph illustrating a fluctuation in a light amount of the light source 11a in a case where light source turn-on control is performed by the first operation mode, and (b) of FIG. 20 is a graph illustrating a fluctuation in a light amount of the light source 11a in a case where light source turn-on control is performed by the second operation mode. In a case of the light source turn-on control by the first operation mode ((a) in FIG. 20), turn-on of the light source 11a is started from the vicinity of an end portion of a detection region D61 having a density of 75 [%], such that it takes some time to stabilize a light amount of the light source 11a and a shift to a stable period in which a light amount is stable is performed after the middle of a detection region D62 having a density of 60 [%]. On the other hand, in a case of the light source turn-on control by the second operation mode ((b) in FIG. 20), turn-on of the light source 11a is started before an upper end of the subject P reaches the reading position of the reading device 11 and turn-on of the light source 11a is started before the end portion of the detection region D61 having the density of 75 [%] reaches the reading position, such that a shift to a stable period in which a light amount of the light source 11a is stable is performed before the end portion of the detection region D61 reaches the reading position. Note that as illustrated in FIG. 20, for detection regions of each density, a density of 75 [%] is the detection region D61, a density of 60 [%] is the detection region D62, and a density of 50 [%] is the detection region D63, a density of 35 [%] is the detection region D64, and a density of 20 [%] is the detection region D65.

Read values for each detection region in a case where the light source turn-on control for the light source 11a as described above is performed in the first operation mode and the second operation mode are illustrated by graphs of FIG. 21, and an example of specific read values are illustrated in the following Table 1. Note that the reading value is an average value (average value of a plurality of pixel groups in the main scanning direction and the sub-scanning direction) of the read values in each detection region (detection regions D61 to D65) illustrated in FIG. 20.

TABLE 1

| | Read value [digit] | |
|---|---|---|
| Density [%] | First operation mode | Second operation mode |
| 75 | 43 | 33 |
| 60 | 65 | 59 |
| 50 | 80 | 80 |
| 35 | 121 | 121 |
| 20 | 186 | 186 |

As illustrated in FIG. 21 and Table 1, in the first operation mode, in the detection regions D61 and D62 of the densities of 75 [%] and 60[%], the light amount is not in the stable period. Therefore, as compared with a case where the second operation mode is applied, the reading device 11 performs reading with a slightly excessive light amount, such that the read values become slightly higher values. That is, there is an error in a high density region.

Note that the image pattern having the densities of the plurality of gradations by gray scale has been illustrated in the example of the subject P illustrated in FIGS. 19 and 20, but the present invention is not limited thereto. For example, the same can be said for three primary colors of light such as red, green, and blue, three primary colors of colors such as cyan, magenta, and yellow, or density (color) information of any mixture of the above colors.

As described above, in a case where the first operation mode is applied in a case of reading the subject P on which the image pattern is formed (printed) at the plurality of densities, the subject P may be read with an excessive light amount during a period that is not the stable period of the light amount. Therefore, even though there is no problem in an image forming condition of the image forming device, which is a correction target, there is a possibility that an erroneous determination that correction of the image forming condition is required will be caused. On the other hand, by applying the second operation mode in a case of reading the subject P on which the image pattern is formed (printed) at the plurality of densities, it is possible to realize a high-quality and stable reading operation.

Seventh Embodiment

An image reading device according to a seventh embodiment will be described focusing on a difference from the image reading device 10b according to the fourth embodiment. In the present embodiment, an image reading device in which a configuration of performing white shading correction processing on an image signal output from a reading device 11 is added to a configuration of the image reading device 10b according to the fourth embodiment will be described.

In a reading device typified by a contact image sensor (CIS), an amount of sensor output signal obtained when reading a subject of which spectral reflectance (density) is uniform in the main scanning direction has been known to exhibit characteristics changing in the main scanning direction. Causes of occurrence of such a change in the main scanning direction (hereinafter, referred to as a main scanning illuminance distribution) include a shape of a light guide body for irradiating the subject in the main scanning direction with light by incidence of light from a light source such as an LED, an assembly positional relationship between the light guide body and other peripheral components, a positional relationship with the subject, a variation in sensitivity characteristics of a sensor (photoelectric conversion element) itself included in the reading device, and the like. White shading correction processing has been generally known as a technology for absorbing such a variation.

Block Configuration of Image Reading Device

Figure 22:
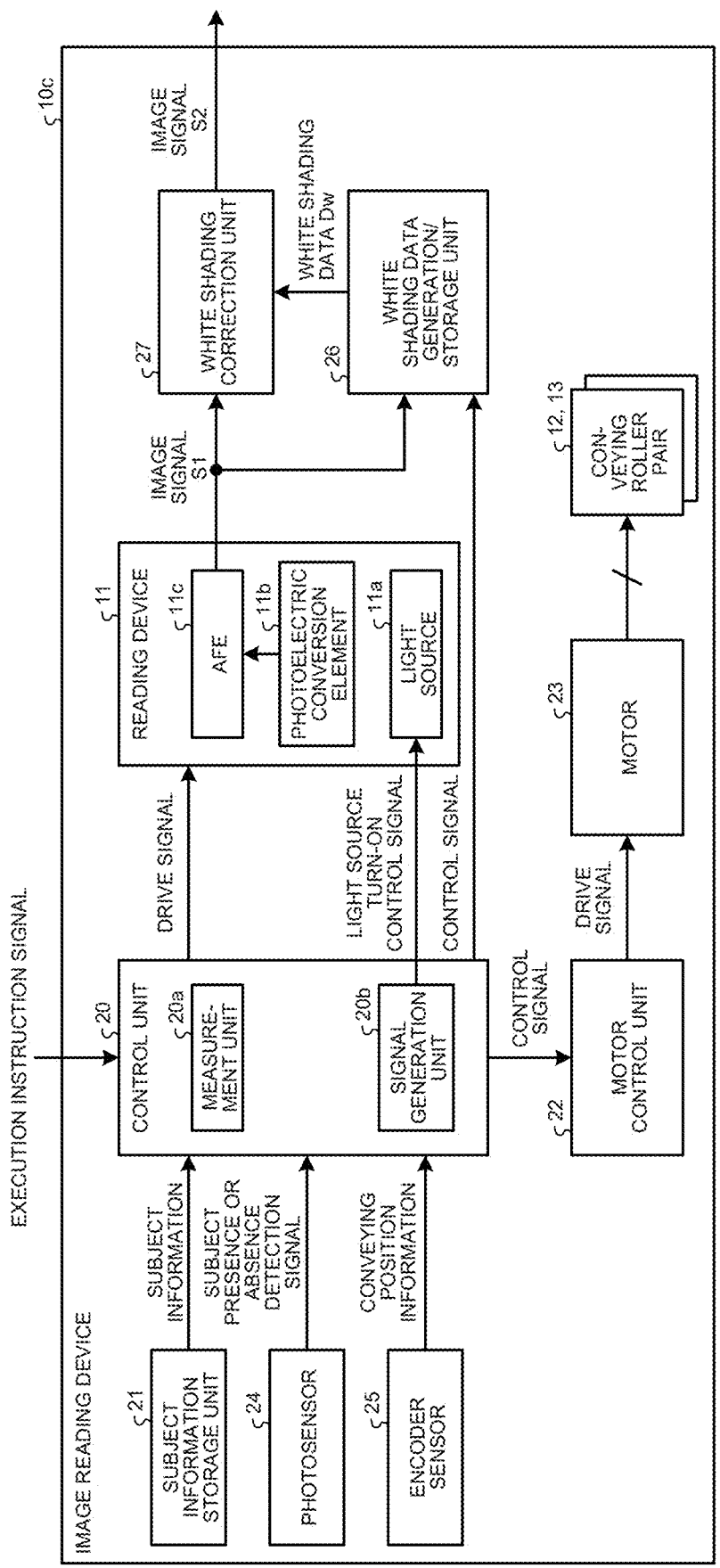
FIG. 22 is a diagram illustrating an example of a block configuration of an image reading device according to a seventh embodiment.

FIG. 22 is a diagram illustrating an example of a block configuration of an image reading device according to a seventh embodiment. A block configuration of an image reading device 10c according to the present embodiment will be described with reference to FIG. 22.

As illustrated in FIG. 22, the image reading device 10c includes a reading device 11, a control unit 20, a subject information storage unit 21, a motor control unit 22, a motor 23, a photosensor 24, an encoder sensor 25, a white shading data generation/storage unit 26 (generation unit), a white shading correction unit 27 (first correction unit), a first conveying roller pair 12, and a second conveying roller pair 13.

The white shading data generation/storage unit 26 is a module that generates and stores white shading data Dw (white correction data) by acquiring an image signal Sb for a predetermined period (predetermined number of lines) with an arbitrary timing as a starting point by a control signal output from the control unit 20. The white shading data generation/storage unit 26 includes, for example, a random access memory (RAM), and stores the white shading data Dw in the RAM. A generation manner of the white shading data Dw includes a manner of acquiring image signals obtained by emitting light for a predetermined number of lines and removing a random noise component by calculating an average value for the predetermined number of lines or a most frequent value for each pixel, for example, in a case where the reference member 16 is a member having a uniform density over the entire region in the main scanning direction, but is not limited thereto.

The white shading correction unit 27 is a module that reads the white shading data Dw from the white shading data generation/storage unit 26 with respect to the image signal S1 output from the reading device 11, executes white shading correction processing for the image signal S1 by calculation represented in the following Equation 3, and outputs an image signal S2 as the corrected signal. Note that so-called black shading correction processing (black subtraction processing) for subtracting an output signal (dark time output) of the reading device 11 when the light source 11a is turned off from an output signal of the reading device 11 when the light source 11a is turned on may be performed on the image signal.

$$S2(n)=S1(n)/Dw(n)\times \alpha \qquad (3)$$

(n: pixel number)

α in Equation 3 is a correction coefficient, and is not particularly limited as long as it can be expressed as a digital value according to a hardware configuration, such as 255 (8 bits) and 1023 (10 bits).

Note that calculation is performed for each pixel in the above Equation 3, but a configuration is not limited to a calculation in which calculation is performed for each pixel, and a manner of generating and holding white shading data Dw for each of a plurality of pixels and applying the white shading data Dw to the white shading correction processing may be used.

Reading Operation in Case of Performing White Shading Correction

Figure 23:
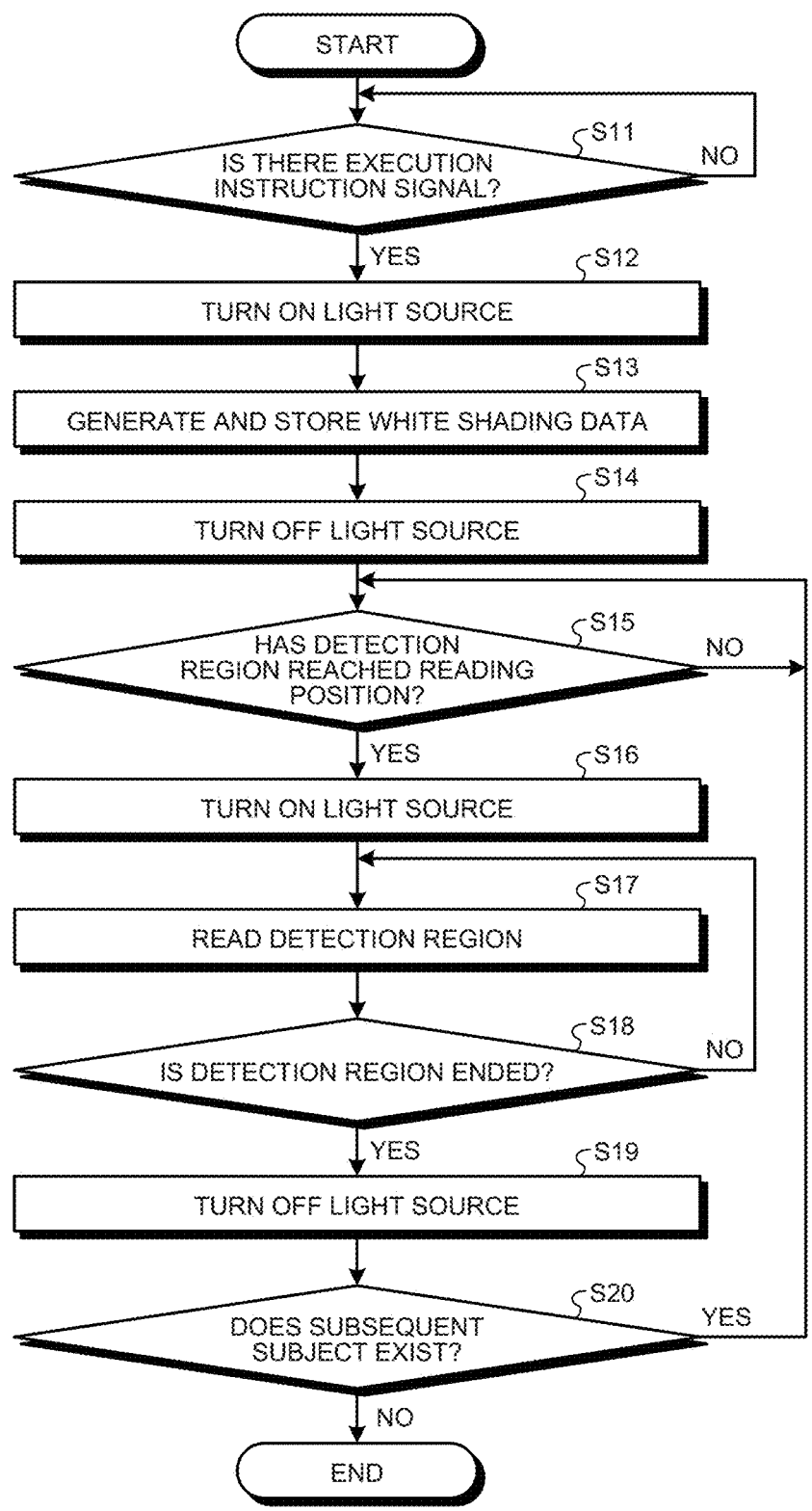
FIG. 23 is a flowchart illustrating an example of a flow of reading operations in a case of performing white shading correction of the image reading device according to the seventh embodiment.

FIG. 23 is a flowchart illustrating an example of a flow of reading operations in a case of performing white shading correction of the image reading device according to the seventh embodiment. A flow of a reading operation in a case of performing the white shading correction in the image reading device 10c according to the present embodiment will be described with reference to FIG. 23.

Step S11

The control unit 20 confirms whether or not an execution instruction signal, which is an external signal, has been received. In a case where the execution instruction signal has been received (Step S1: Yes), the process proceeds to Step S12, and in a case where the execution instruction signal has not been received (Step S11: No), the control unit 20 continuously confirms whether or not the execution instruction signal has been received.

Step S12

The control unit 20 starts turn-on of the light source 11a by outputting a light source turn-on control signal so that the white shading data generation/storage unit 26 generates and stores the white shading data Dw before the subject P reaches the reading position of the reading device 11. Then, the process proceeds to Step S13.

Step S13

The reading device 11 reads the reference member 16 and outputs the image signal S1 under the control of the control unit 20. Then, the white shading data generation/storage unit 26 generates and stores the white shading data Dw from the image signal S1 according to the control signal output from the control unit 20. Then, the process proceeds to Step 314.

Step S14

The control unit 20 stops the output of the light source turn-on control signal and turns off the light source 11a. Then, the process proceeds to Step S15.

Step S15

The control unit 20 determines whether or not the detection region of the subject P has reached the reading position of the reading device 11 based on the position information of the image pattern read from the subject information storage unit 21, the subject presence or absence detection signal output from the photosensor 24, and the pulse signal output from the encoder sensor 25. In a case where the detection region of the subject P has reached the reading position (Step S15: Yes), the process proceeds to Step S16, and when the detection region of the subject P has not reached the reading position (Step S15: No), the process waits until the detection region of the subject P will reach the reading position. Note that the determination of whether or not the detection region has reached the reading position may be made in consideration of a waiting time required for stabilizing the light amount of the light source 11a, for example, as described above in the sixth embodiment. That is, when an upper end of the detection region in the sub-scanning direction has reached the reading position is not a limitation.

Step S16

The control unit 20 starts turn-on of the light source 11a by outputting a light source turn-on control signal in order to read the detection region of the subject P. Then, the process proceeds to Step S17.

Step S17

The control unit 20 causes the reading device 11 to start reading of the detection region of the subject P. Then, the process proceeds to Step S18.

Step S18

The control unit 20 determines whether or not the detection region on the conveyed subject P has passed through the reading position. In a case where the detection region has passed through the reading position (Step S18: Yes), the process proceeds to Step S19, and in a case where the detection region has not passed through the reading position (Step S18: No), the reading device 11 continues the reading operation.

Step S19

The control unit 20 stops the output of the light source turn-on control signal and turns off the light source 11a. Then, the process proceeds to Step S20.

Step S20

The control unit 20 determines whether or not a subsequent subject exists. In a case where the subsequent subject exists (Step S20: Yes), the process returns to Step S15, and in a case where the subsequent subject does not exist (Step S20: No), the control unit 20 ends the reading operation.

In a general image reading device, so-called white shading correction processing is performed, but an operation of reading a reference member having a density different from that of the subject is required in order to execute the white shading correction processing. In a case of continuously reading a plurality of subjects, it is desirable to regenerate and update the white shading data at a predetermined timing in order to maintain an image quality of each subject. For this reason, a technology of regenerating and updating white shading data during a period from an end of a reading operation of an arbitrary subject until a shift to a reading operation of the next subject has been known, but such control is not preferable in terms of power saving and lifetime prolongation. Further, a reference member of a density does not necessarily always face the reading device depending on a configuration of the device, and a case of being accompanied by a moving operation of the reference member in order to generate the white shading data is also assumed. This operation is accompanied by power consumption, and further causes an increase in the entire operating time of the reading operation, resulting in a decrease in productivity.

In view of the concern described above, in the present embodiment, for example, in a case of applying the first operation mode, in order to realize a high-quality reading operation, a generating and storing operation of the white shading data by the white shading data generation/storage unit 26 is performed once before the start of a series of reading operations for a plurality of subjects. As a result, it is possible to limit a generation time of the white shading data to a minimum necessary time while securing a constant image quality by realizing the so-called white shading correction processing, realize power saving of the image reading device 10c and lifetime prolongation of the light source 11a, and shorten the entire operation time of the read operation to improve productivity.

Eighth Embodiment

An image reading device according to an eighth embodiment will be described focusing on a difference from the image reading device according to each of the embodiments described above. In the present embodiment, a configuration of a light source 11a of a reading device 11 in which a plurality of LEDs are arranged in the main scanning direction and a turn-on operation based on the configuration will be described.

Configuration of Light Source

Figure 24:
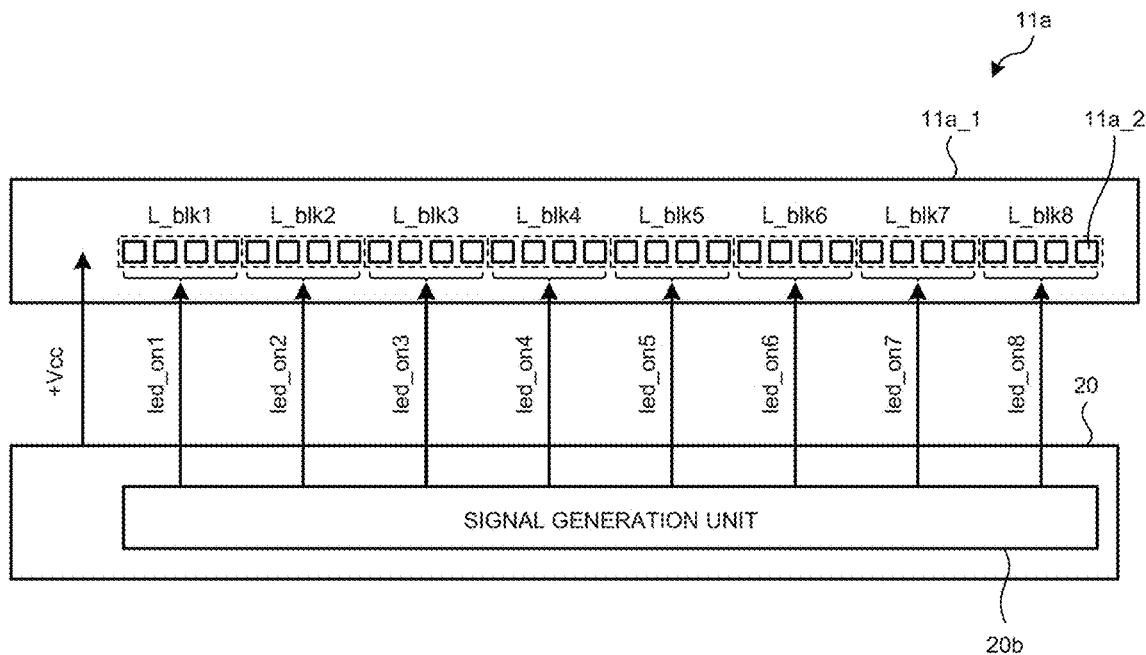
FIG. 24 is a diagram illustrating an example of a configuration of main units of an image reading device according to an eighth embodiment.
Figure 25:
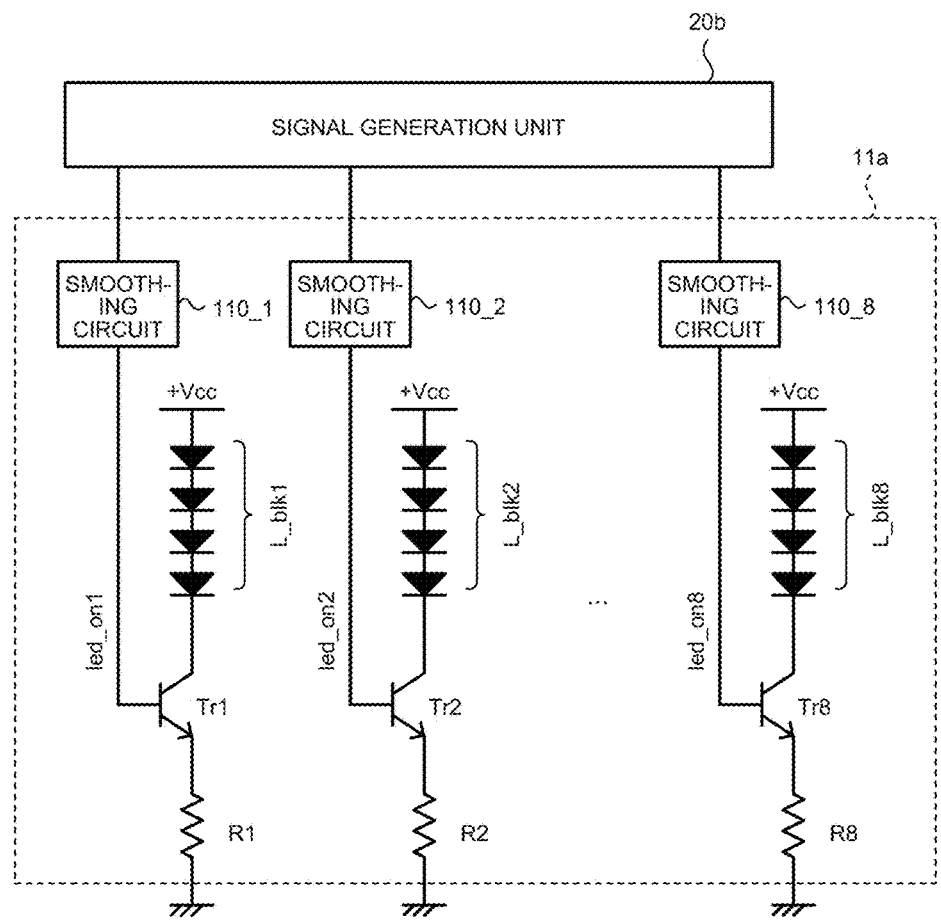
FIG. 25 is a diagram illustrating an example of a circuit configuration of main units related to turn-on of a light source in the eighth embodiment.

FIG. 24 is a diagram illustrating an example of a configuration of main units of an image reading device according to an eighth embodiment. FIG. 25 is a diagram illustrating an example of a circuit configuration of main units related to turn-on of a light source in the eighth embodiment.

A configuration of main units of the image reading device according to the present embodiment will be described with reference to FIGS. 24 and 25.

As illustrated in FIG. 24, the light source 11a of the image reading device has a configuration in which thirty-two LED chips 11a_2 are arranged in the main scanning direction on an LED substrate 11a_1 extending in the main scanning direction. The thirty-two LED chips 11a_2 are configured so that four LED chips becomes one block, such that a total of eight blocks (L_blk1 to L_blk8) are configured. The four LED chips 11a_2 in one block are connected to each other in series as described later in FIG. 25. A signal generation unit 20b of a control unit 20 can output independent light source turn-on control signals led_on1 to led_on8, respectively, to the blocks L_blk1 to L_blk8. In addition, the control unit 20 supplies a power supply voltage (+Vcc) required for turning on each LED chip 11a_2, to the LED substrate 11a_1.

As illustrated in FIG. 25, the light source 11a includes the blocks L_blk1 to L_blk8, which are blocks for each of the four LED chips 11a_2 described above, smoothing circuits 110_1 to 110_8 that smooth the light source turn-on control signals led_on1 to led_on8 to each block and convert the smoothed light source turn-on control signals led_on1 to led_on8 to direct current (DC) levels, transistors Tr1 to Tr8, which are switches for turning on the LED chips 11a_2 of each block, and resistors R1 to R8, which are protective resistors when each block is turned on. The light source turn-on control signals led_on1 to led_on8 having a predetermined duty ratio output from the signal generation unit 20b are converted into the DC levels by the smoothing circuits 110_1 to 110_8 and are input to bases of the transistors Tr1 to Tr8, respectively. Then, emitter voltages of the transistors Tr1 to Tr8 are determined by base voltages and base-emitter voltages of the transistors Tr1 to Tr8, and current values flowing through the blocks L_blk1 to L_blk8 are determined by the emitter voltages and the resistors R1 to R8. In addition, the smoothing circuits 110_1 to 110_8 may be, for example, filters having a simple configuration, such as an RC filter, but are not limited thereto.

Note that the configuration of the light source 11a illustrated in FIGS. 24 and 25 is an example, is not limited thereto, and only needs to be a configuration in which a plurality of LED chips 11a_2 arranged in the main scanning direction are divided into a plurality of blocks (the number of LED chips 11a_2 per block may be arbitrary) and independent light source turn-on control of each block is possible.

Light Source Turn-on Control in First Operation Mode

Figure 26:
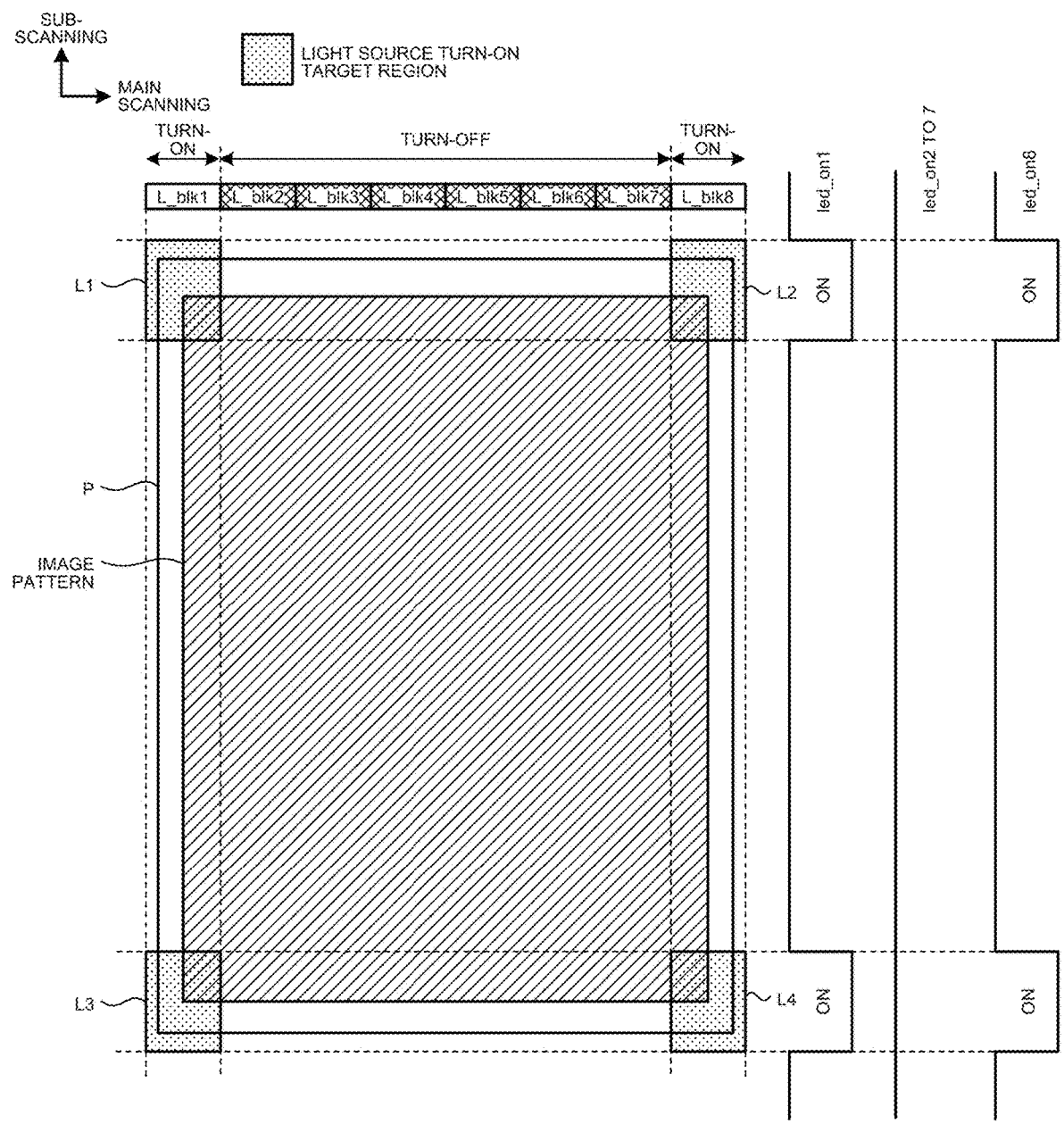
FIG. 26 is a diagram illustrating an example of light emitting diode (LED) selection according to an image pattern in the eighth embodiment.

FIG. 26 is a diagram illustrating an example of LED selection according to an image pattern in the eighth embodiment. The light source turn-on control in the first operation mode in the image reading device according to the present embodiment will be described with reference to FIG. 26.

FIG. 26 illustrates an example when estimating outer shapes of a subject P and an image pattern by detecting positions of end portions of the subject P (four corners of the subject P) and positions of end portions of the image pattern (four corners of the image pattern), as in the fifth embodiment described in FIGS. 16 and 17. In FIG. 26, since it is sufficient that coordinates of the four corners of the subject P and the image pattern can be detected as described above, the control unit 20 turns on only the block L_blk1 and the block L_blk8 of the blocks of the LED chips 11a_2 arranged in the main scanning direction, and turns off the blocks L_blk2 to L_blk7 of the blocks of the LED chips 11a_2 arranged in the main scanning direction. That is, the control unit 20 performs ON/OFF control only for the light source turn-on control signal led_on1 and the light source turn-on control signal led_on8 at a predetermined timing, and makes the light source turn-on control signals led_on2 to led_on7 always OFF. Further, since it is only necessary to turn on peripheries of upper ends (front ends) or lower ends (rear ends) of the subject P and the image pattern even in the sub-scanning direction, regions, which become turn-on targets by the light source 11a with respect to the subject P including the image pattern, are light source turn-on target regions L1 to L4 illustrated in FIG. 26.

Note that the reading position has been described as an application example in the first operation mode of changing the turn-on condition while scanning the subject P in the sub-scanning direction in FIG. 26, but a case where consideration is required to some extent for stability of a light amount of the light source 11a is also assumed. In that case, the second operation mode of making the light source turn-on control signals led_on1 and led_on8 ON may be applied during a period from before the upper end of the subject P in the sub-scanning direction reaches the reading position until the lower end of the subject P in the sub-scanning direction passes through the reading position.

Light Source Turn-on Control in Second Operation Mode

Figure 27:
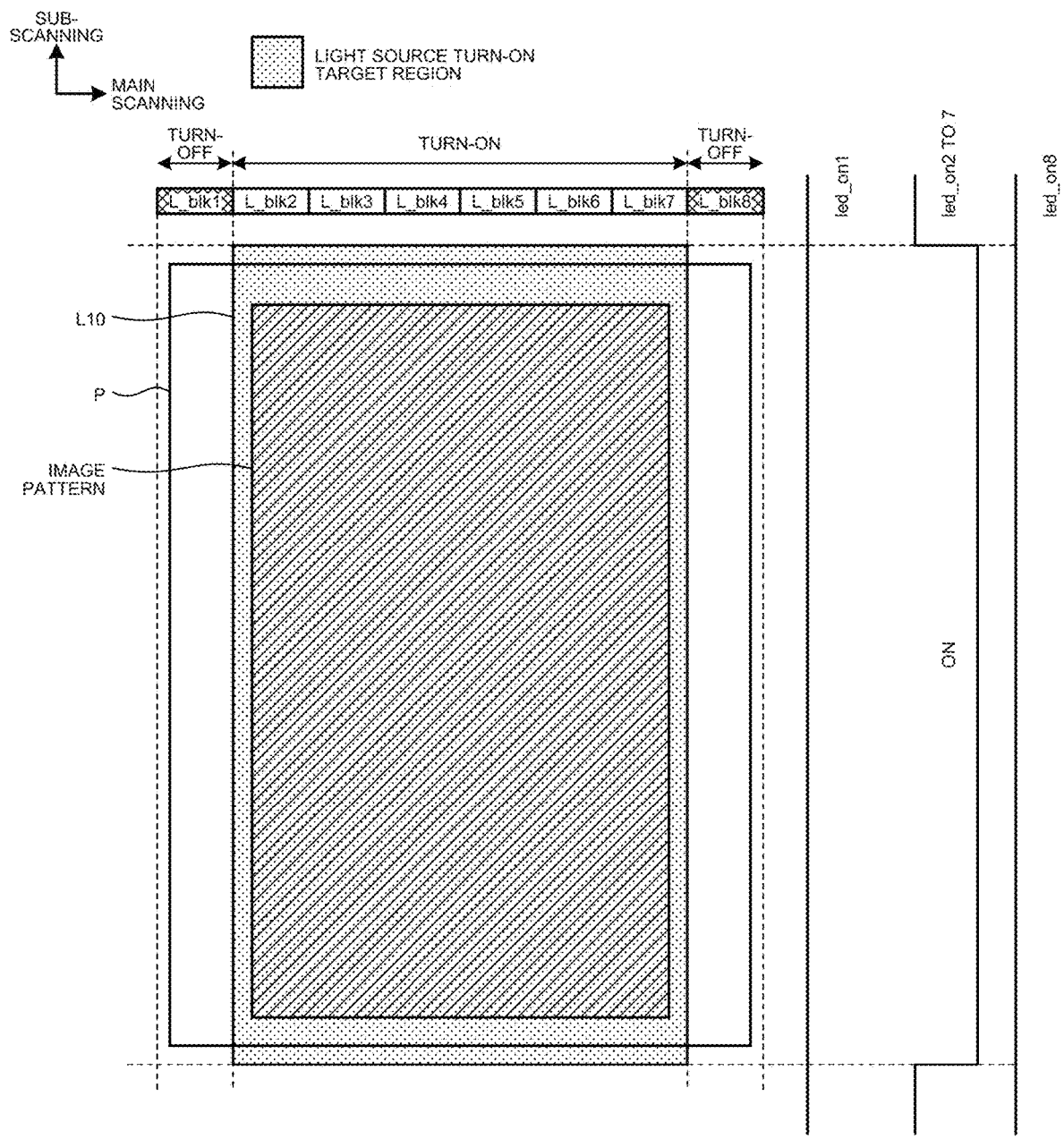
FIG. 27 is a diagram illustrating an example of LED selection according to the image pattern in the eighth embodiment.

FIG. 27 is a diagram illustrating an example of LED selection according to an image pattern in the eighth embodiment. The light source turn-on control in the second operation mode in the image reading device according to the present embodiment will be described with reference to FIG. 27.

FIG. 27 illustrates an example when detecting the density in each detection region of the image pattern as illustrated in FIG. 19 described above, for example. In FIG. 27, an arrangement of the image pattern in the main scanning direction is substantially the center of the subject P, and the vicinities of left and right ends are outside the detection regions. Therefore, the control unit 20 turns on the blocks L_blk2 to L_blk7 of the blocks of the LED chips 11a_2 arranged in the main scanning direction, and turns off the blocks L_blk1 and L_blk8 of the blocks of the LED chips 11a_2 arranged in the main scanning direction. That is, the control unit 20 performs ON/OFF control for the light source turn-on control signals led_on2 to led_on7 at a predetermined timing, and makes the light source turn-on control signals led_on1 and led_on8 always OFF.

In addition, the control unit 20 applies the second operation mode of starting the turn-on of the blocks L_blk2 to L_blk7 before the upper end (front end) of the subject P in the sub-scanning direction reaches the reading position, in consideration of a time (unstable period) required for stabilizing the light amount of the light source 11a even in the sub-scanning direction, and performing turning off after the lower end (rear end) of the subject P in the sub-scanning direction passes through the reading position.

Note that in a case where power saving of the image reading device and lifetime prolongation of the light source 11a are emphasized as much as possible, the first operation mode of performing ON/OFF control of the light source turn-on control signals led_on2 to led_on7 based on positions of the upper end and the lower end of the image pattern on the subject P may be applied.

As described above, in the present embodiment, the light source 11a of the reading device 11 is configured by arranging the plurality of LED chips 11a_2 in the main scanning direction, the plurality of LED chips 11a_2 are divided into the plurality of blocks in the main scanning direction, and the independent light source turn-on control is possible. As a result, the light source turn-on control for only the detection regions not only in the sub-scanning direction but also in the main scanning direction becomes possible, such that effects of the power saving of the image reading device and the lifetime prolongation of the light source $11a$ can be further improved. In addition, an application development such as setting a turn-on condition to a turn-on condition in which the stability of the light amount of the light source $11a$ is considered in sub-scanning direction while selectively switching a block to be used according to the image pattern (detection region) of the subject P in the main scanning direction also becomes possible, such that effects of the power saving of the image reading device, the lifetime prolongation of the light source $11a$, a high quality, and high stability can be exhibited with a good balance, and comprehensive performance of the image reading device can be further improved.

Note that since the blocks that do not need to be turned on can be always turned off depending on the position of the detection region in the main scanning direction on the subject P, as described above, the lifetime prolongation of the light source $11a$ can be promoted, while there is a possibility that a deviation will occur in lifetime between the blocks. Therefore, the blocks used in the first operation mode and the second operation mode may be different from each other, that is, be exclusively switched. For example, the blocks used in the first operation mode and the second operation mode are exclusively switched in such a way that the blocks L_blk1 and L_blk8 are used by applying the first operation mode in the example illustrated in FIG. 26 and the blocks L_blk2 to L_blk7 are used by applying the second operation mode in the example illustrated in FIG. 27, as described above. As a result, it is possible to suppress the occurrence of the lifetime deviation between the blocks of the LED chip $11a\_2$.

Ninth Embodiment

An image forming device according to a ninth embodiment will be described. Note that it is described in the present embodiment that an image forming device includes the image reading device 10 according to the first embodiment described above, but the image forming device may include any one of the image reading devices according to the second to eighth embodiments described above.

Entire Structure of Image Forming Device

Figure 28:
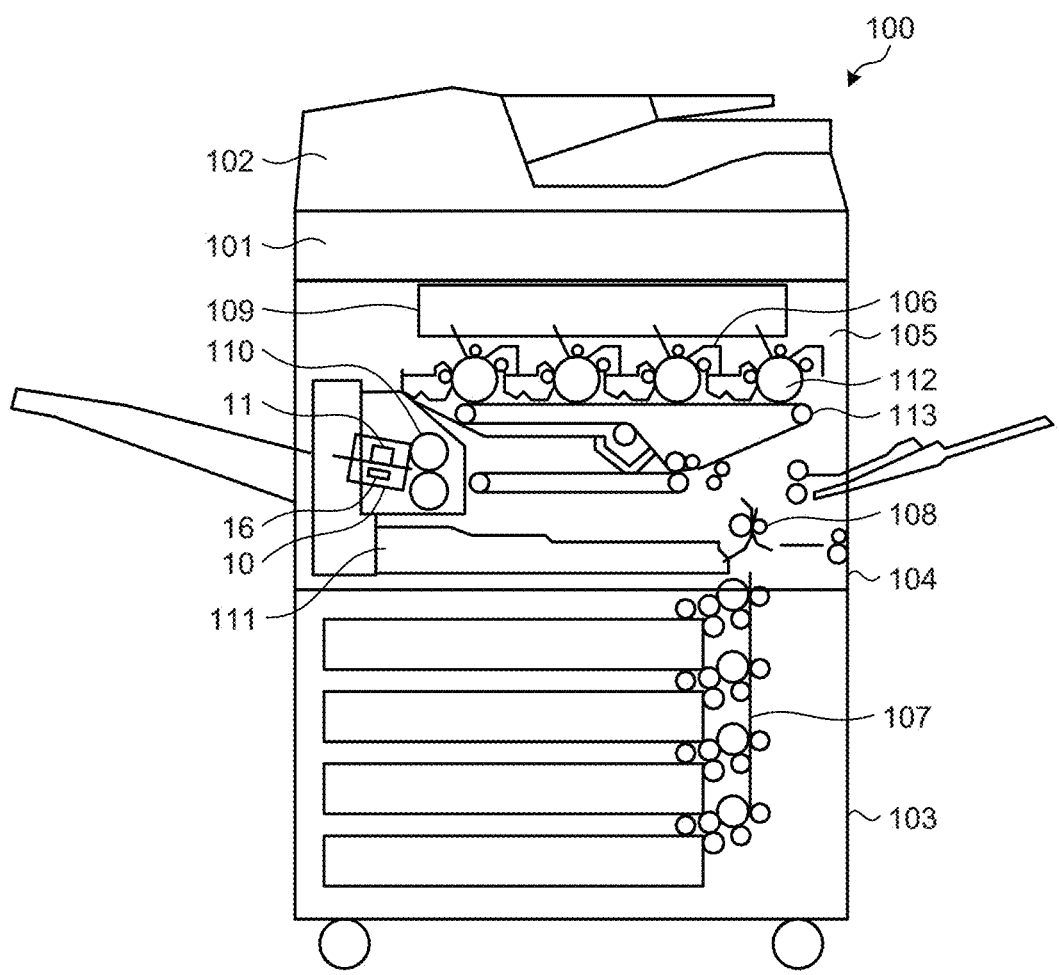
FIG. 28 is a diagram illustrating an example of an entire structure of an image forming device according to a ninth embodiment.

FIG. 28 is a diagram illustrating an example of an entire structure of an image forming device according to the ninth embodiment. An entire structure of an image forming device 100 according to the present embodiment will be described with reference to FIG. 28.

As illustrated in FIG. 28, the image forming device 100 includes a scanner 101, an auto document feeder (ADF) 102, a paper feeding unit 103, and an image forming unit 104. As the image forming device 100 according to the present embodiment, for example, an electrophotographic image forming device, a multifunction peripheral (MFP) or the like, can be applied. Here, the multifunction peripheral is a device that has at least two of a printing function, a copying function, a scanner function, and a fax function. Hereinafter, the image forming device 100 according to the present embodiment will be described as being the multifunction peripheral.

The scanner 101 is a device that is arranged between the image forming unit 104 and a contact glass and reads an image of a document supplied on the contact glass. The ADF 102 is a device that automatically feeds a document placed on a platen to the contact glass. The paper feeding unit 103 is a unit that sends out a recording medium such as a paper and feeds the recording medium to an image forming unit 105 via a conveying path 107.

The image forming unit 104 is a device that forms an image read by the scanner 101 on the recording medium such as the paper. The image forming unit 104 includes an optical writing device 109, the image forming unit 105, a registration roller 108, a duplex tray 111, an intermediate transfer belt 113, a fixing unit 110, and an image reading device 10.

The optical writing device 109 is a device that emits a laser beam optically modulated based on the image read by the scanner 101 to expose surfaces of photoconductor drums 112 of the image forming unit 105 that are uniformly charged, thereby forming electrostatic latent images on the surfaces.

The image forming unit 105 is a device that performs image formation by transferring toner images formed on the photoconductor drums 112 to the recording medium. The image forming unit 105 includes four photoconductor drums 112 corresponding to four colors of Y (yellow), M (magenta), C (cyan), and K (black), a charging device, a developing device 106, a transfer device, a cleaning device, and a fixing unit 110.

The photoconductor drum 112 is, for example, a drum-shaped member in which a tube stock formed of aluminum or the like is coated with a photosensitive layer formed of an organic photosensitive material having photosensitivity, and is rotationally driven.

The charging device is a charging roller to which an alternating current (AC) voltage is applied, and is strangely charged by coming into sliding-contact with the photoconductor drum 112.

The developing device 106 is a device that supplies a toner to the photoconductor drum 112 on which the electrostatic latent image is formed by the optical writing device 109 to develop the electrostatic latent image and form the toner image.

The transfer device is a device that transfers the toner image to the recording medium conveyed between the photoconductor drum 112 and the transfer device by a transfer bias between the photoconductor drum 112 and the transfer device when the toner image formed on the surface of the photoconductor drum 112 comes to a position facing the transfer device by the rotation of the photoconductor drum 112.

The cleaning device is a device that removes and cleans the toner remaining on the surface of the photoconductor drum 112 after the toner image is transferred by the transfer device.

The registration roller 108 is a roller that supplies the recording medium from the paper feeding unit 103 to the image forming unit 104 via the conveying path 107.

The duplex tray 111 is a device that reverses the recording medium printed on one side and supplies the recording medium to the registration roller 108 again.

The intermediate transfer belt 113 is a belt that is stretched between a driving roller and a driven roller in a state of being nipped by a nip between the transfer device and the photoconductor drum 112, and is a belt on which the toner image of the photoconductor drum 112 is primarily transferred. Then, the intermediate transfer belt 113 secondarily transfers the toner image in a full color that is primarily transferred, to the recording medium.

The fixing unit 110 is a device that fixes the toner image to the recording medium on which the toner image is transferred by the intermediate transfer belt 113, by an action of heating and pressure. The recording medium (subject P) to which the toner image is fixed by the fixing unit 110 is supplied to the image reading device 10, such that a reading operation is performed by the image reading device 10. The image reading device 10 has a reading device 11 for performing position detection of the subject P and position detection of a reference member 16.

Block Configuration of Image Reading Device

Figure 29:
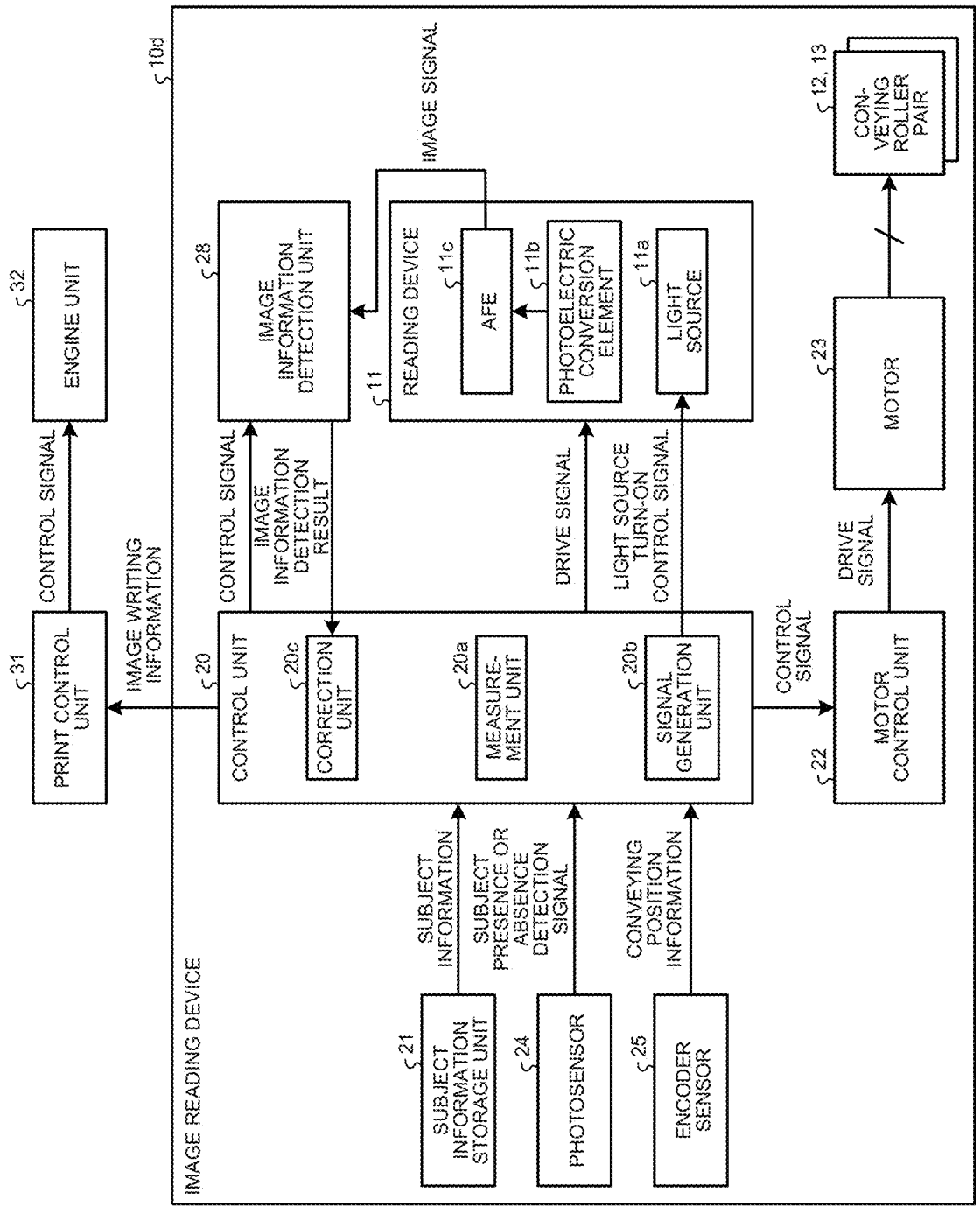
FIG. 29 is a diagram illustrating an example of a block configuration of an image reading device according to the ninth embodiment.

FIG. 29 is a diagram illustrating an example of a block configuration of an image reading device according to the ninth embodiment. A block configuration of an image reading device 10d according to the present embodiment will be described with reference to FIG. 29. Note that it has been described in FIG. 28 that the image forming device 100 according to the present embodiment includes the image reading device 10 according to the first embodiment, but in FIG. 29, it is assumed that the image forming device 100 includes an image reading device 10d, and the image reading device 10d will be described focusing on a difference from the image reading device 10a according to the second embodiment.

As illustrated in FIG. 29, the image reading device 10d includes a reading device 11, a control unit 20, a subject information storage unit 21, a motor control unit 22, a motor 23, a photosensor 24, an encoder sensor 25, an image information detection unit 28, a first conveying roller pair 12, and a second conveying roller pair 13. In addition, the image forming device 100 includes a print control unit 31 and an engine unit 32, in addition to the image reading device 10d.

The reading device 11 reads an image pattern by detecting reflected light reflected from the subject P in response to irradiating the subject P with light from a light source, and outputs an image signal, but in the present embodiment, a transfer paper (transferred recording medium) as the subject P is a reading target.

The image information detection unit 28 extracts a feature amount (position information in the main scanning direction or the sub-scanning direction, a density, color information, or the like) of the image pattern on the transfer paper from the image signal output from the reading device 11 upon receiving a control signal from the control unit 20 indicating a detection start timing, and outputs an extraction result to the control unit 20 as an image information detection result.

The control unit 20 outputs the control signal indicating the detection start timing to the image information detection unit 28. The control unit 20 includes a measurement unit 20a, a signal generation unit 20b, and a correction unit 20c (second correction unit).

The correction unit 20c calculates a correction value based on the image information detection result from the image information detection unit 28, generates image writing information using the correction value, and notifies the print control unit 31 of the image writing information.

The print control unit 31 controls the engine unit 32 based on the image writing information to control image writing to the transfer paper.

As such, in the image forming device 100 according to the present embodiment, the position information, the density information, and the like, of the image pattern printed on the subject P (transfer paper) are grasped and, as a result, can be applied to correction of a printing condition on the subject P (transfer paper).

Note that a method applied to the image forming device 100 including the image reading device 10d has been described in the present embodiment described above, but this is not a limitation. For example, even a utilization method of obtaining a correction value for a transfer paper printed by a further image forming device by the above-mentioned processing by the image reading device 10d and reflecting the correction value in the further image forming device is possible.

In addition, each function of each of the embodiments described above can be realized by one or a plurality of processing circuits. Here, the "processing circuit" includes a device such as a processor programmed to execute each function by software, such as a processor implemented by an electronic circuit, an ASIC, a DSP, an FPGA, an SoC, or a GPU designed to execute each of the functions described above, or a conventional circuit module.

In addition, in each of the embodiments described above, in a case where at least one of the functional units of the image reading devices 10 and 10a to 10d is realized by executing a program, the program is incorporated and provided in advance in a read only memory (ROM) or the like. In addition, in each of the embodiments described above, a program executed by the image reading devices 10 and 10a to 10d may be configured to be recorded and provided on a computer-readable recording medium such as a compact disc read only memory (CD-ROM), a flexible disk (FD), a compact disk-recordable (CD-R), or a digital versatile disc (DVD) in a file of an installable format or an executable format. In addition, in each of the embodiments described above, the program executed by the image reading devices 10 and 10a to 10d may be configured to be stored on a computer connected to a network such as the Internet and be provided by being downloaded via the network. In addition, in each of the embodiments described above, the program executed by the image reading devices 10 and 10a to 10d may be configured to be provided or distributed via the network such as the Internet. In addition, in each of the embodiments described above, the program executed by the image reading devices 10 and 10a to 10d has a module configuration including at least one of the functional units described above, and as actual hardware, the CPU reads the program from the storage device described above and executes the program, such that each of the functional units described above is loaded on a main storage device and generated.

According to an embodiment, a quality of a printed image can be comprehensively improved by appropriately switching and controlling a turn-on condition of a light source according to each operation mode in a plurality of operation modes.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image reading device comprising:
    a light source configured to irradiate a subject with light;
    a reader configured to detect reflected light generated by the subject reflecting light emitted from the light source, to perform reading;
    a control circuitry configured to perform turn-on control on the light source; and
    a memory configured to store position information of an image pattern of the subject, wherein
    the control circuitry is configured to perform the turn-on control to change a turn-on condition such that the light source is turned on during a first period when at least a detection region including an image pattern on the subject passes through a reading position of the reader and the light source is turned off or turned on with a light amount lower than a light amount of the first period during a second period when a region other than the detection region passes through the reading position of the reader, based on the position information stored in the memory in a first operation mode for reading the subject, and
    the control circuitry is configured to perform the turn-on control to make the turn-on condition of the light source constant during a third period when the subject passes through the reading position of the reader regardless of the image pattern of the subject passing through the reading position of the reader in a second operation mode for reading the subject.

2. The image reading device according to claim 1, further comprising a position detector configured to measure a relative positional relationship between the subject and the reader, wherein
    the control circuitry is configured to control the turn-on condition of the light source based on a result of the positional relationship measured by the position detector.

3. The image reading device according to claim 1, wherein the control circuitry is configured to perform the turn-on control of the light source such that the image pattern on the subject reaches the reading position after a predetermined time has elapsed since turn-on of the light source has been started.

4. The image reading device according to claim 1, wherein the control circuitry is configured to perform the turn-on control to start turn-on of the light source after an external signal has been input.

5. The image reading device according to claim 1, wherein the control circuitry is configured to detect a position of an end portion of the subject or a position of an end portion of the image pattern on the subject by the first operation mode.

6. The image reading device according to claim 1, wherein the control circuitry is configured to perform turn-on control by the light source with respect to an image pattern formed at a plurality of densities or in a plurality of colors on the subject by the second operation mode.

7. The image reading device according to claim 1, further comprising:
    a generator configured to generate white correction data using a reading result in a case where a reference member having a predetermined density is read by the reader; and
    a first corrector configured to correct a reading result by the reader using the white correction data generated by the generator,
    wherein the generator is configured to generate the white correction data before start of a series of reading operations for a plurality of subjects by the reader and not to generate the white correction data until end of the reading operations, in a case where the turn-on control is performed in the first operation mode by the control circuitry.

8. The image reading device according to claim 1, wherein the light source comprises a single or a plurality of light emitting diodes (LEDs).

9. The image reading device according to claim 8, wherein
    the light source comprises a plurality of LEDs arranged in a main scanning direction, and
    the control circuitry is configured to selectively switch an LED to be used according to the image pattern of the subject.

10. The image reading device according to claim 9, wherein the control circuitry is configured to perform the turn-on control such that an LED turned on in the first operation mode and an LED turned on in the second operation mode are different from each other.

11. The image reading device according to claim 1, further comprising a second corrector configured to calculate a correction value for a recording condition of an image pattern on the subject from a reading result read by the reader.

12. An image reading method comprising:
    detecting reflected light generated by a subject reflecting light emitted from a light source configured to irradiate the subject with light, to perform reading;
    performing turn-on control to change a turn-on condition such that the light source is turned on during a first period when at least a detection region including an image pattern on the subject passes through a reading position in the reading and the light source is turned off or turned on with a light amount lower than a light amount of the first period during a second period when a region other than the detection region passes through the reading position in the reading, based on position information of an image pattern of the subject stored in a memory in a first operation mode for reading the subject; and
    performing turn-on control to make the turn-on condition of the light source constant during a third period when the subject passes through the reading position in the reading regardless of the image pattern of the subject passing through the reading position in the reading in a second operation mode for reading the subject.

13. A non-transitory computer-readable medium including programmed instructions that cause a computer to perform:
    causing a reader to detect reflected light generated by a subject reflecting light emitted from a light source configured to irradiate the subject with light, to perform reading;
    performing turn-on control to change a turn-on condition such that the light source is turned on during a first period when at least a detection region including an image pattern on the subject passes through a reading position in the reading and the light source is turned off or turned on with a light amount lower than a light amount of the first period during a second period when a region other than the detection region passes through the reading position in the reading, based on position information of an image pattern of the subject stored in a memory in a first operation mode for reading the subject; and
    performing turn-on control to make the turn-on condition of the light source constant during a third period when the subject passes through the reading position in the reading regardless of the image pattern of the subject passing through the reading position in the reading in a second operation mode for reading the subject.

* * * * *